US009465607B2

(12) United States Patent
Shanmugam et al.

(10) Patent No.: US 9,465,607 B2
(45) Date of Patent: Oct. 11, 2016

(54) CONFIGURATION-BASED PROCESSING OF REQUESTS BY CONDITIONAL EXECUTION OF SOFTWARE CODE TO RENDER REGIONS IN A DISPLAY

(71) Applicant: ORACLE INTERNATIONAL CORPORATION, Redwood Shores, CA (US)

(72) Inventors: Vijayakumar Shanmugam, Orlando, FL (US); Sudipto Chakraborty, Noida (IN); Dilbaghsingh Sardar, Hyderabad (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 14/735,516

(22) Filed: Jun. 10, 2015

(65) Prior Publication Data

US 2015/0363191 A1 Dec. 17, 2015

Related U.S. Application Data

(60) Provisional application No. 62/011,017, filed on Jun. 11, 2014.

(51) Int. Cl.

| | |
|---|---|
| ***G06F 9/44*** | (2006.01) |
| ***G06F 9/00*** | (2006.01) |
| ***H04L 29/08*** | (2006.01) |
| ***H04L 29/06*** | (2006.01) |
| ***G06F 17/30*** | (2006.01) |

(52) U.S. Cl.
CPC . *G06F 8/70* (2013.01); *G06F 9/00* (2013.01); *G06F 17/30595* (2013.01); *H04L 67/36* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 7,467,197 | B2 | 12/2008 | Brooks | |
| 7,689,447 | B1 | 3/2010 | Aboujaoude | |
| 7,885,847 | B2 | 2/2011 | Wodtke | |
| 7,979,296 | B2 | 7/2011 | Kruse | |
| 8,467,817 | B2 | 6/2013 | Said | |
| 2003/0204427 | A1* | 10/2003 | Gune | G06Q 10/10 705/1.1 |

(Continued)

OTHER PUBLICATIONS

Sybase Mobile Workflow for SAP Business Suite 1.2, Overview and Customization, pp. 56, believed to be published in 2011, at http://www.sybase.com/files/White_Papers/Sybase_MobileWorkflowForSAPBusSuite_technical_wp.pdf.

(Continued)

*Primary Examiner* — Daxin Wu
(74) *Attorney, Agent, or Firm* — Omar K. Suryadevara; Silicon Valley Patent Group LLP

(57) ABSTRACT

Server(s) prepare requests to obtain user input indicative of at least one of approval or disapproval by conditionally including therein one or more regions based on rules. The rules are configurable, and each rule is associated with an identifier of a software code. On receipt of a message identifying a request, rules corresponding to regions includable in the request are evaluated to identify regions to be rendered. For a to-be-rendered region a software code identified in a rule action pair is executed to obtain one or more rows, each row including multiple name value pairs. The server(s) prepare content of the request, by including each name value pair in a single line among multiple lines for a row, the multiple lines being sequenced relative to one another in a specific sequence to be displayed by a mobile device, the specific sequence being configurable.

20 Claims, 34 Drawing Sheets

(56) References Cited

U.S. PATENT DOCUMENTS

| | | | | |
|---|---|---|---|---|
| 2005/0154741 | A1 | 7/2005 | Hebert | |
| 2006/0218533 | A1* | 9/2006 | Koduru | G06F 11/3447 717/124 |
| 2008/0154690 | A1 | 6/2008 | Mommeja | |
| 2009/0132281 | A1 | 5/2009 | Lyshkow | |
| 2010/0114926 | A1 | 5/2010 | Agrawal | |
| 2012/0042039 | A1 | 2/2012 | Mark | |
| 2012/0084108 | A1 | 4/2012 | Bohannon | |
| 2012/0137309 | A1* | 5/2012 | Makam | G06Q 10/10 719/320 |
| 2013/0318152 | A1* | 11/2013 | Iyer | G06F 9/541 709/203 |

OTHER PUBLICATIONS

Using Universal Worklist, p. 1, believed to be published on or prior to Jan. 27, 2014 at http://help.sap.com/saphelp_nw70ehp1/helpdata/en/57/c223be82104792a15c2df11377b9ed/content.htm.

Oracle BPM 11g Mobile Worklist with ADF Mobile, pp. 5, believed to be published on or prior to Jan. 27, 2014 at http://andrejusb-samples.blogspot.in/2013/04/jdevadf-sample-oracle-bpm-11g-mobile.html.

Understanding PeopleSoft Mobile Applications, pp. 2, http://docs.oracle.com/cd/E39583_01/fscm92pbr0/eng/fscm/fspf/concept_UnderstandingPeopleSoftMobileApplications.html.

Sybase Mobile Workflow Data Change Notification, pp. 3, on or prior to Jan. 27, 2014, at http://infocenter.sybase.com/help/index.jsp?topic=/com.sybase.infocenter.dc01218.0155/doc/html/vhu1284047564100.html.

Using Universal Worklist on Mobile, p. 1, believed to be published on or prior to Jan. 27, 2014 at https://help.sap.com/saphelp_enterpriseworkspaces11/helpdata/en/69/279a13a294480d8375278357f944c5/content.htm?frameset=/en/ee/3837a07b3141a3a0f42a6ecdfa6ace/frameset.htm.

MAXAlert, pp. 3, believed to be published on or prior to Jan. 29, 2014 at http://imaxeam.com/maximo-mobile/maxalert-workflow-notification.

Ax Workflow iPhone inbox (mERPi), pp. 3, believed to be published on or prior to Jan. 29, 2014 at http://www.axnosis.com/iphone.aspx.

Apple Push Notification Service, pp. 10, believed to be published on or prior to Jan. 29, 2014 at https://developer.apple.com/library/IOS/documentation/NetworkingInternet/Conceptual/RemoteNotificationsPG/Chapters/ApplePushService.html.

Workflow and application adaptations in mobile environments, pp. 8, believed to be published prior to May 20, 2014, http://ieeexplore.ieee.org/xpl/articleDetails.jsp?tp=&arnumber=749278&matchBoolean%3Dtrue%26searchField%3DSearch_All%26queryText%3D%28%28%28workflow%29+OR+worklist%29+AND+mobile%29.

Developing Workflow Engine for Mobile Devices, pp. 2, believed to be published on or prior to Jan. 29, 2014 http://ieeexplore.ieee.org/xpl/articleDetails.jsp?tp=%arnumber=4384000&matchBoolean%3Dtrue%26pageNumber%3D3%26searchField%3DSearch_All%26queryText%3D%28%28%28workflow%29+OR+worklist%29+AND+mobile%29.

Sybase Mobile Workflow for SAP Business Suite, p. 1, believed to be published on or prior to Jan. 27, 2014, at http://www.sybase.in/products/mobileenterprise/mobileworkflowforsapbusinesssuite.

* cited by examiner

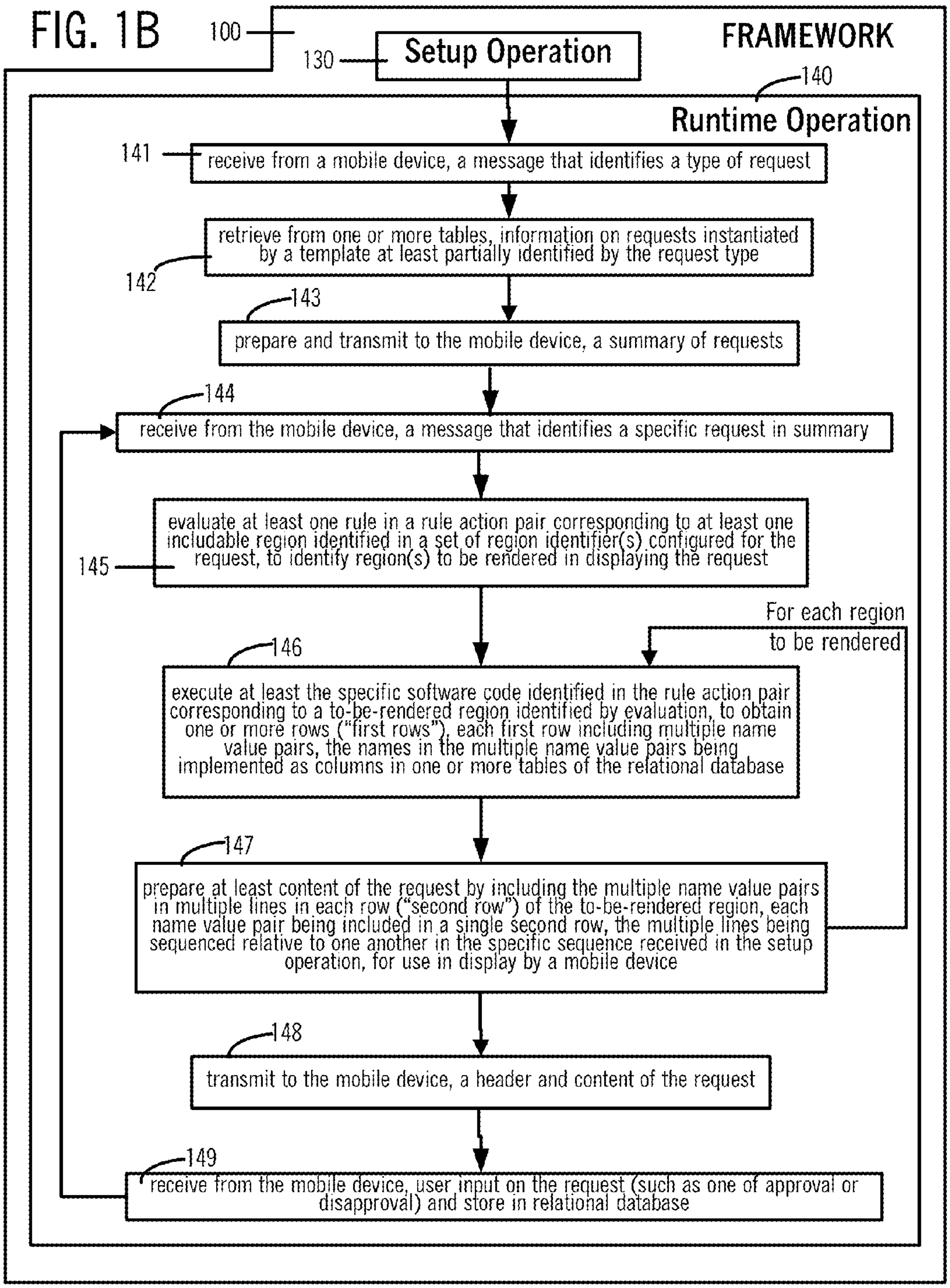
FIG. 1B
100
FRAMEWORK
130
Setup Operation
140
Runtime Operation
141
receive from a mobile device, a message that identifies a type of request
142
retrieve from one or more tables, information on requests instantiated by a template at least partially identified by the request type
143
prepare and transmit to the mobile device, a summary of requests
144
receive from the mobile device, a message that identifies a specific request in summary
145
evaluate at least one rule in a rule action pair corresponding to at least one includable region identified in a set of region identifier(s) configured for the request, to identify region(s) to be rendered in displaying the request
For each region to be rendered
146
execute at least the specific software code identified in the rule action pair corresponding to a to-be-rendered region identified by evaluation, to obtain one or more rows ("first rows"), each first row including multiple name value pairs, the names in the multiple name value pairs being implemented as columns in one or more tables of the relational database
147
prepare at least content of the request by including the multiple name value pairs in multiple lines in each row ("second row") of the to-be-rendered region, each name value pair being included in a single second row, the multiple lines being sequenced relative to one another in the specific sequence received in the setup operation, for use in display by a mobile device
148
transmit to the mobile device, a header and content of the request
149
receive from the mobile device, user input on the request (such as one of approval or disapproval) and store in relational database

FIG. 6A

```xml
<?xml version = '1.0' encoding = 'UTF-8'?>
<response status="200">
  <ns5:output xmlns="http://xmlns.oracle.com/apps/fnd/wf/worklist/service/rt/artifacts/notificationdetails/"
xmlns:ns2="http://xmlns.oracle.com/apps/fnd/wf/worklist/service/rt/artifacts/fault/" xmlns:ns3="http://
xmlns.oracle.com/apps/fnd/wf/worklist/service/rt/artifacts/worklistmgmt/" xmlns:ns4="http://xmlns.oracle.com/
apps/fnd/wf/worklist/service/rt/artifacts/directoryservices/" xmlns:ns5="http://xmlns.oracle.com/apps/fnd/wf/
worklist/service/rt/artifacts/worklist/">
    <notificationdetails>
      <header>
        <region name="Custom Header">
          <view>
            <row>
              <attribute name="Description" id="0">Hand-Rubbed Hardwood Desk Set, Walnut Base with 10 kt Gold
Filled Ball Pen and Pencil</attribute>
              <attribute name="Justification" id="1"/>
              <attribute name="Non-Recoverable Tax" id="2">0.00 USD</attribute>
              <attribute name="Requisition Total" id="3">460.00 USD</attribute>
            </row>
          </view>
        </region>
        <region name="Header">
          <view>
            <row>
              <attribute order="0" type="String" name="From" id="FromUser">Baker, Catherine</attribute>
              <attribute order="1" type="String" name="To" id="ToUser">Brown, Casey</attribute>
              <attribute order="2" type="Date" name="Sent" id="BeginDateF">2014-04-01T04:56:09.000Z</attribute>
              <attribute order="3" type="Date" name="Due" id="DueDateF"/>
              <attribute order="7" type="String" name="ID" id="NotificationId">6275012</attribute>
            </row>
          </view>
        </region>
      </header>
      <body>
        <region id="1022" name="Requisition Lines" part="DETAILS"/>
        <region id="1021" name="Action History" part="HISTORY"/>
      </body>
      <result>
        <attribute type="APPROVE" name="APPROVE" id="0">Approve</attribute>
        <attribute name="APPROVE_AND_FORWARD" id="1">Approve And Forward</attribute>
        <attribute name="FORWARD" id="2">Forward</attribute>
        <attribute type="REJECT" name="REJECT" id="3">Reject</attribute>
      </result>
      <control/>
    </notificationdetails>
  </ns5:output>
</response>
```

FIG. 6B

```
<?xml version = '1.0' encoding = 'UTF-8'?>
<response status="200">
  <ns5:output xmlns="http://xmlns.oracle.com/apps/fnd/wf/worklist/service/rt/artifacts/
notificationdetails/" xmlns:ns2="http://xmlns.oracle.com/apps/fnd/wf/worklist/service/rt/artifacts/
fault/" xmlns:ns3="http://xmlns.oracle.com/apps/fnd/wf/worklist/service/rt/artifacts/worklistmgmt/"
xmlns:ns4="http://xmlns.oracle.com/apps/fnd/wf/worklist/service/rt/artifacts/directoryservices/"
xmlns:ns5="http://xmlns.oracle.com/apps/fnd/wf/worklist/service/rt/artifacts/worklist/">
    <notificationdetails>
      <body>
        <region id="1022" name="Requisition Lines" part="DETAILS">
          <view arrange="detail">
            <row>
              <attribute order="1" type="0" name="Line" id="Line">1</attribute>    601A
              <attribute order="2" type="0" name="Description" id="Description">Hand-Rubbed
Hardwood Desk Set, Walnut Base with 10 kt Gold Filled Ball Pen and Pencil</attribute>    601B
              <attribute order="3" type="0" name="Supplier" id="SuggSupplier">Corporate Express
Office Supply</attribute>    601C
              <attribute order="4" type="0" name="Cost Center" id="CostCenter">740</attribute>    601D
              <attribute order="5" type="0" name="Unit" id="Uom">SET</attribute>    601E
              <attribute order="6" type="0" name="Quantity" id="Quantity">3</attribute>    601F
              <attribute order="7" type="0" name="Price" id="RateConsolidate">100 USD</attribute>    601G
              <attribute order="8" type="0" name="Amount" id="LineAmtConsolidate">300 USD</
attribute>    601H
            </row>
            <row>
              <attribute order="1" type="0" name="Line" id="Line">2</attribute>
              <attribute order="2" type="0" name="Description" id="Description">Lustrous Chrome
Pen and Pencil Set</attribute>
              <attribute order="3" type="0" name="Supplier" id="SuggSupplier">Corporate Express
Office Supply</attribute>
              <attribute order="4" type="0" name="Cost Center" id="CostCenter">740</attribute>
              <attribute order="5" type="0" name="Unit" id="Uom">EA</attribute>
              <attribute order="6" type="0" name="Quantity" id="Quantity">4</attribute>
              <attribute order="7" type="0" name="Price" id="RateConsolidate">40 USD</attribute>
              <attribute order="8" type="0" name="Amount" id="LineAmtConsolidate">160 USD</
attribute>
            </row>
          </view>
        </region>
      </body>
    </notificationdetails>
  </ns5:output>
</response>
```

601 (first row), 602 (second row)

FIG. 6C

```
<?xml version = '1.0' encoding = 'UTF-8'?>
<response status="200">
  <ns5:output xmlns="http://xmlns.oracle.com/apps/fnd/wf/worklist/service/rt/artifacts/notificationdetails/"
xmlns:ns2="http://xmlns.oracle.com/apps/fnd/wf/worklist/service/rt/artifacts/fault/" xmlns:ns3="http://
xmlns.oracle.com/apps/fnd/wf/worklist/service/rt/artifacts/worklistmgmt/" xmlns:ns4="http://xmlns.oracle.com/
apps/fnd/wf/worklist/service/rt/artifacts/directoryservices/" xmlns:ns5="http://xmlns.oracle.com/apps/fnd/wf/
worklist/service/rt/artifacts/worklist/">
    <notificationdetails>
      <header>
        <region name="Custom Header">
          <view>
            <row>
              <attribute name="Description" id="0">Event Planner contract</attribute>
              <attribute name="Justification" id="1"/>
              <attribute name="Non-Recoverable Tax" id="2">0.00 USD</attribute>
              <attribute name="Requisition Total" id="3">1,000.00 USD</attribute>
            </row>
          </view>
        </region>
        <region name="Header">
          <view>
            <row>
              <attribute order="0" type="String" name="From" id="FromUser">Stock, Pat</attribute>
              <attribute order="1" type="String" name="To" id="ToUser">Brown, Casey</attribute>
              <attribute order="2" type="Date" name="Sent" id="BeginDateF">2014-04-01T05:22:17.000Z</attribute>
              <attribute order="3" type="Date" name="Due" id="DueDateF"/>
              <attribute order="7" type="String" name="ID" id="NotificationId">6275023</attribute>
            </row>
          </view>
        </region>
      </header>
      <body>
        <region id="1023" name="Requisition Lines contract" part="DETAILS"/>
        <region id="1021" name="Action History" part="HISTORY"/>
      </body>
      <result>
        <attribute type="APPROVE" name="APPROVE" id="0">Approve</attribute>
        <attribute name="APPROVE_AND_FORWARD" id="1">Approve And Forward</attribute>
        <attribute name="FORWARD" id="2">Forward</attribute>
        <attribute type="REJECT" name="REJECT" id="3">Reject</attribute>
      </result>
      <control/>
    </notificationdetails>
  </ns5:output>
</response>
```

FIG. 6D

```xml
<?xml version = '1.0' encoding = 'UTF-8'?>
<response status="200">
  <ns5:output xmlns="http://xmlns.oracle.com/apps/fnd/wf/worklist/service/rt/artifacts/notificationdetails/"
xmlns:ns2="http://xmlns.oracle.com/apps/fnd/wf/worklist/service/rt/artifacts/fault/" xmlns:ns3="http://
xmlns.oracle.com/apps/fnd/wf/worklist/service/rt/artifacts/worklistmgmt/" xmlns:ns4="http://xmlns.oracle.com/
apps/fnd/wf/worklist/service/rt/artifacts/directoryservices/" xmlns:ns5="http://xmlns.oracle.com/apps/fnd/wf/
worklist/service/rt/artifacts/worklist/">
    <notificationdetails>
      <body>
        <region id="1023" name="Requisition Lines contract" part="DETAILS">
          <view arrange="detail">
            <row>
              <attribute order="1" type="0" name="Line" id="Line">1</attribute>
              <attribute order="2" type="0" name="Description" id="Description">Event Planner</attribute>
              <attribute order="3" type="0" name="Supplier" id="SuggSupplier"/>
              <attribute order="4" type="0" name="Contractor Name" id="ContractorName"/>
              <attribute order="5" type="0" name="Contractor Status" id="ContractorStatus">Not Applicable</
attribute>
              <attribute order="6" type="Date" name="Start Date" id="StartDate">2014-04-02T07:00:00.000Z</
attribute>
              <attribute order="7" type="0" name="End Date" id="EndDate"/>
              <attribute order="8" type="0" name="Cost Center" id="CostCenter">740</attribute>
              <attribute order="9" type="0" name="Unit" id="Uom"/>
              <attribute order="10" type="0" name="Quantity" id="Quantity"/>
              <attribute order="11" type="0" name="Price" id="RateConsolidate"> USD</attribute>
              <attribute order="12" type="0" name="Amount" id="LineAmtConsolidate">500 USD</attribute>
            </row>
            <row>
              <attribute order="1" type="0" name="Line" id="Line">1.1</attribute>
              <attribute order="2" type="0" name="Description" id="Description">Event Planner - Expense</
attribute>
              <attribute order="3" type="0" name="Supplier" id="SuggSupplier"/>
              <attribute order="4" type="0" name="Contractor Name" id="ContractorName"/>
              <attribute order="5" type="0" name="Contractor Status" id="ContractorStatus"/>
              <attribute order="6" type="0" name="Start Date" id="StartDate"/>
              <attribute order="7" type="0" name="End Date" id="EndDate"/>
              <attribute order="8" type="0" name="Cost Center" id="CostCenter">740</attribute>
              <attribute order="9" type="0" name="Unit" id="Uom"/>
              <attribute order="10" type="0" name="Quantity" id="Quantity"/>
              <attribute order="11" type="0" name="Price" id="RateConsolidate"> USD</attribute>
              <attribute order="12" type="0" name="Amount" id="LineAmtConsolidate">500 USD</attribute>
            </row>
          </view>
        </region>
      </body>
    </notificationdetails>
  </ns5:output>
</response>
```

CONFIGURATION-BASED PROCESSING OF REQUESTS BY CONDITIONAL EXECUTION OF SOFTWARE CODE TO RENDER REGIONS IN A DISPLAY

CROSS-REFERENCE TO PROVISIONAL APPLICATION

This patent application claims priority under 35 USC §119 from U.S. Provisional Application 62/011,017 entitled "CONFIGURATION-BASED PROCESSING OF WORK ITEMS BY CONDITIONAL EXECUTION OF SOFTWARE CODE" filed on Jun. 11, 2014 by Vijayakumar Shanmugam, Sudipto Chakraborty and Dilbaghsingh Sardar, which is hereby incorporated by reference herein in its entirety.

FIELD

This patent application relates to apparatuses, methods and non-transitory computer-readable storage media for processing of requests for user input which are normally used to obtain responses of approval (or disapproval) from users.

BACKGROUND

Client devices ("clients"), such as a desktop computer or a handheld wireless device may execute software instructions in the form of application programs (also called "client apps") that are used by a manager to approve of one or more requests related to work ("work items") in an organization. Examples of work items are requests typically submitted by employees, such as requests for requisition and/or requests for reimbursement of out-of-pocket expenses. Work items typically have one or more attributes, such as amount, due date, description, etc., which may be entered by the employee and displayed to the manager by a client app, in order to obtain the manager's approval (or disapproval) of the work item.

Client apps obtain work items to display to a manager from programs executing in servers that implement business logic (also called "business applications"). Each business application typically provides its own interface, and hence it is common for a specific client app to be designed to retrieve and display work items generated by a corresponding business application. In such systems, a client app designed for one business application cannot retrieve and display work items from another business application. Thus, multiple client apps may be used by a manager, to review and approve work items in multiple business applications.

It is more efficient for a manager to use a single client app to access work items in multiple business applications. Due to existence of multiple interfaces of multiple business applications, creation of the single client app requires re-creation of software instructions that exist in the multiple client apps. Hence, there is a need for apparatuses, methods and non-transitory computer-readable storage media as follows.

SUMMARY

In accordance with the invention, one or more computers (e.g. in which applications are deployed, also called "servers") process requests to obtain user input (e.g. work items), by conditionally including, within the requests, one or more regions (also called "groups of line items"), based on rules. The rules are configurable, and each rule is associated with an identifier of a software code (also called software code identifier) to be executed to render a region (or group of one or more line items) when the rule is satisfied. The rule and the software code identifier together form a pair ("rule action" pair), which corresponds to one region (or line item group) that is includable in a request (e.g. work item).

During setup, servers (also called "second computers") receive one or more selections from one or more clients that are used by one or more developers (also called "first computers") via one or more screens for a template to be used to instantiate each request (e.g. work item). The received selection(s) identify each region (or line item group) that is includable in each request (e.g., work item). For each such region, the selection(s) further identify and a corresponding rule action pair.

During runtime, on receipt of a message identifying a request (or work item), the one or more servers (or second computers) evaluate the one or more rules corresponding to regions (or line item groups) that are includable in an identified request (e.g., work item). The evaluation is performed to identify one or more regions (or line item groups) which are to be rendered (when their corresponding rule is satisfied). For a to-be-rendered region (or line item group), the one or more servers (or second computers) execute a specific software code identified in the rule action pair. The execution is performed to obtain one or more rows of data on the region (or line item group). Each such row of data ("first row", or "data row") may include multiple name value pairs.

The first row(s) of data that are output by execution of the specific software code in one or more servers (or second computers) may be retrieved from a relational database that may store corresponding rows (which are returned by execution of a database query). Hence, in such embodiments, each first row may include multiple name value pairs. The names (which identify attributes of a request) in the multiple name value pairs may be implemented as columns in one or more tables of the relational database.

The one or more servers (or first computers) transmit the multiple name value pairs (or details) of a first row ("data row") output by the specific software code to a mobile device as multiple lines ("display lines") in content of the request (e.g. work item), with or without a header (depending on the embodiment). The transmission is performed to obtain user input indicative of at least one of approval or disapproval of the request (e.g. work item). Each name value pair is included in a single line ("display line") among multiple lines of a row in the request ("second row", or "display row"). Multiple lines ("display lines") within a second row (which correspondingly contain the multiple name value pairs), are sequenced relative to one another in a specific sequence to be displayed by the mobile device. The specific sequence is received as user input, from one or more developer(s) who operate the one or more clients (or first computers).

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 1B illustrates, in a flow chart, acts performed at run time to generate requests to obtain user input indicative of at least one of approval or disapproval, in some illustrative embodiments in accordance with the invention.

FIGS. 6A-6D illustrate output generated by runtime operation 140 of framework 100 by performance of the acts illustrated in FIGS. 5A-5D.

DETAILED DESCRIPTION

Figure 1A:
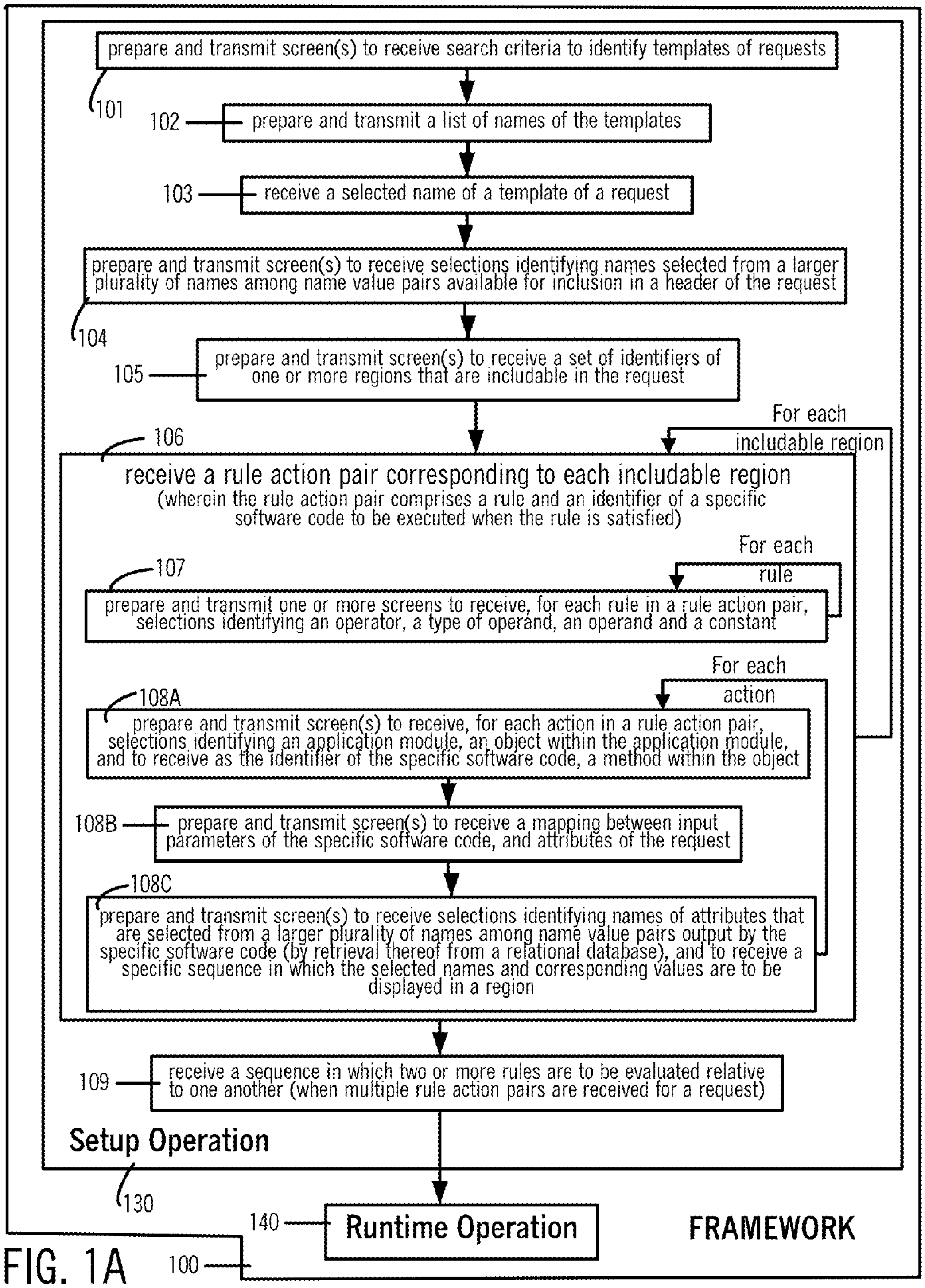
FIG. 1A illustrates, in a flow chart, acts performed to configure generation of requests to obtain user input indicative of at least one of approval or disapproval, in some illustrative embodiments in accordance with the invention.

In illustrative embodiments, one or more computers 200 (also called "servers") may be programmed with software 100 (called "framework") that includes a setup operation 130 and a runtime operation 140 as shown in FIGS. 1A and 1B, as follows. Specifically, in a setup operation 130, the computer(s) perform acts 101-109 as shown in FIG. 1A, to configure generation of requests to obtain user input indicative of at least one of approval or disapproval, e.g. by preparing and transmitting screens to receive selections from one or more computers operated by human(s) (e.g. developers). Thereafter, in a runtime operation 140, the computer(s) perform acts 141-149 as shown in FIG. 1B, to generate requests and receive user input thereon, e.g. by preparing and transmitting requests to receive the user input from one or more mobile devices operated by other human(s) (e.g. approvers). Although acts 101-109 are described below, and illustrated in FIG. 1A in a first sequence ("setup sequence"), they may be performed in any other sequence relative to one another. Similarly, acts 141-149 are described below, and illustrated in FIG. 1B in a second sequence ("runtime sequence"), they may be performed in any other sequence relative to one another. Acts 101-109 of the setup sequence are normally performed before acts 141-149 of the runtime sequence.

Figure 1C:
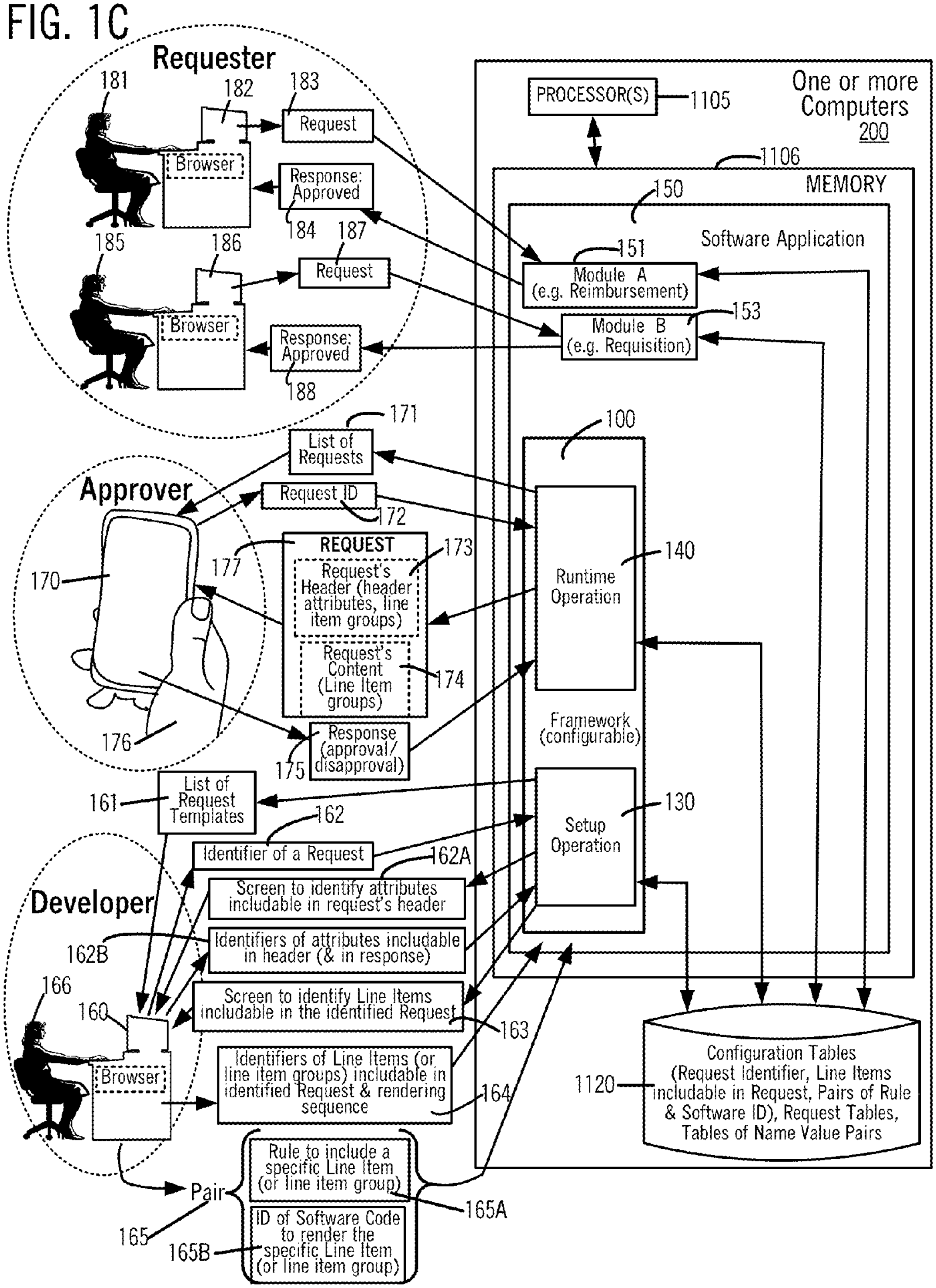
FIG. 1C illustrates, in a data flow diagram, configuration-based processing of work items by use of a framework in certain embodiments in accordance with the invention, by a developer supplying configuration information including identifiers of line items (also called "line item identifiers") that are includable in a work item, and a pair formed by a rule and an identifier of a software code (also called "software code identifier") to be executed to render one or more includable line item(s) in the work item when the rule is satisfied.
Figure 2:
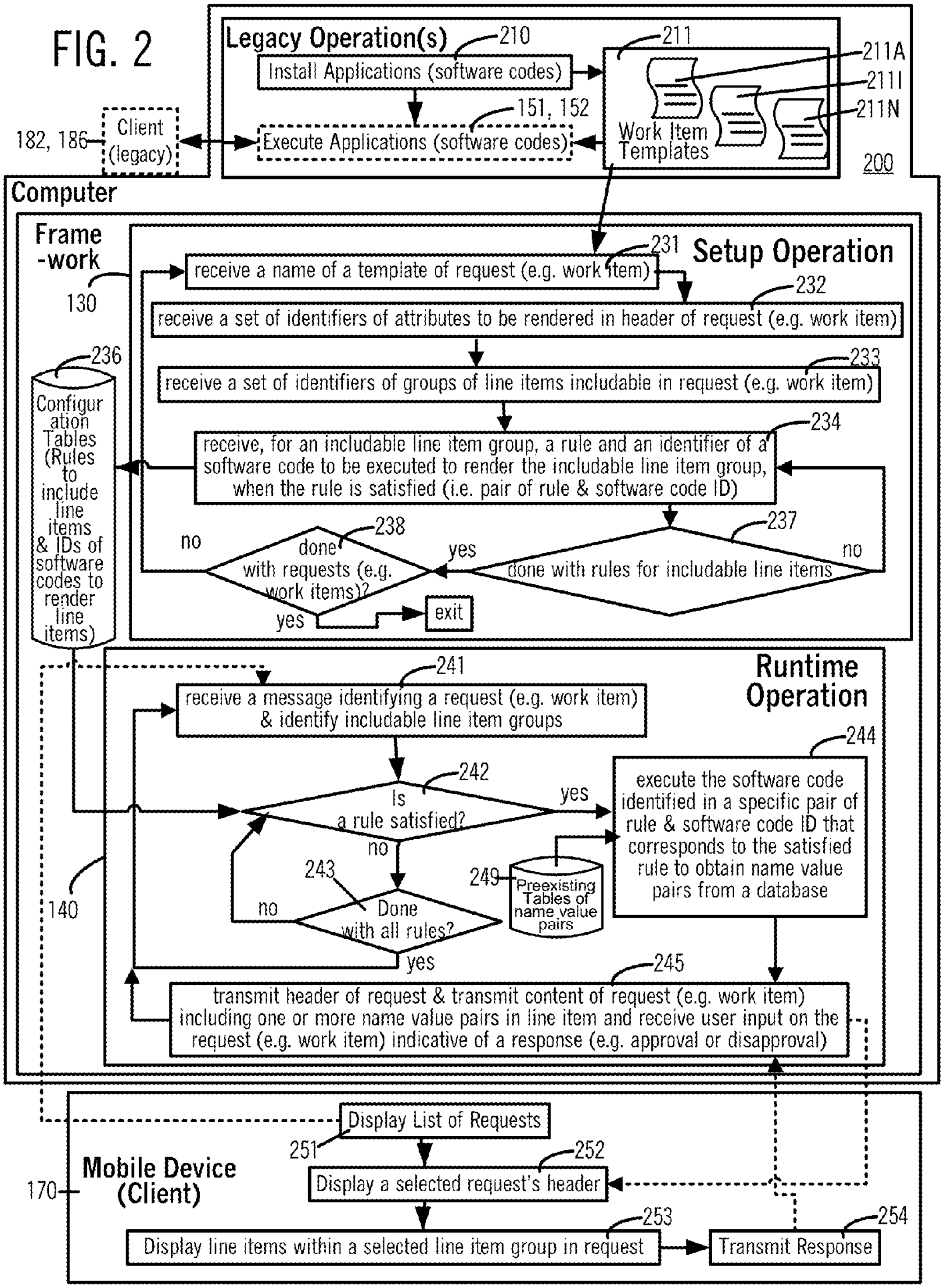
FIG. 2 illustrates, in a flow chart, acts performed in set up operation 130 in the framework of FIGS. 1C and 1F to receive and store configuration information and acts performed in runtime operation 140 to use the stored configuration information to process work items in some illustrative embodiments in accordance with the invention.
Figure 3A:
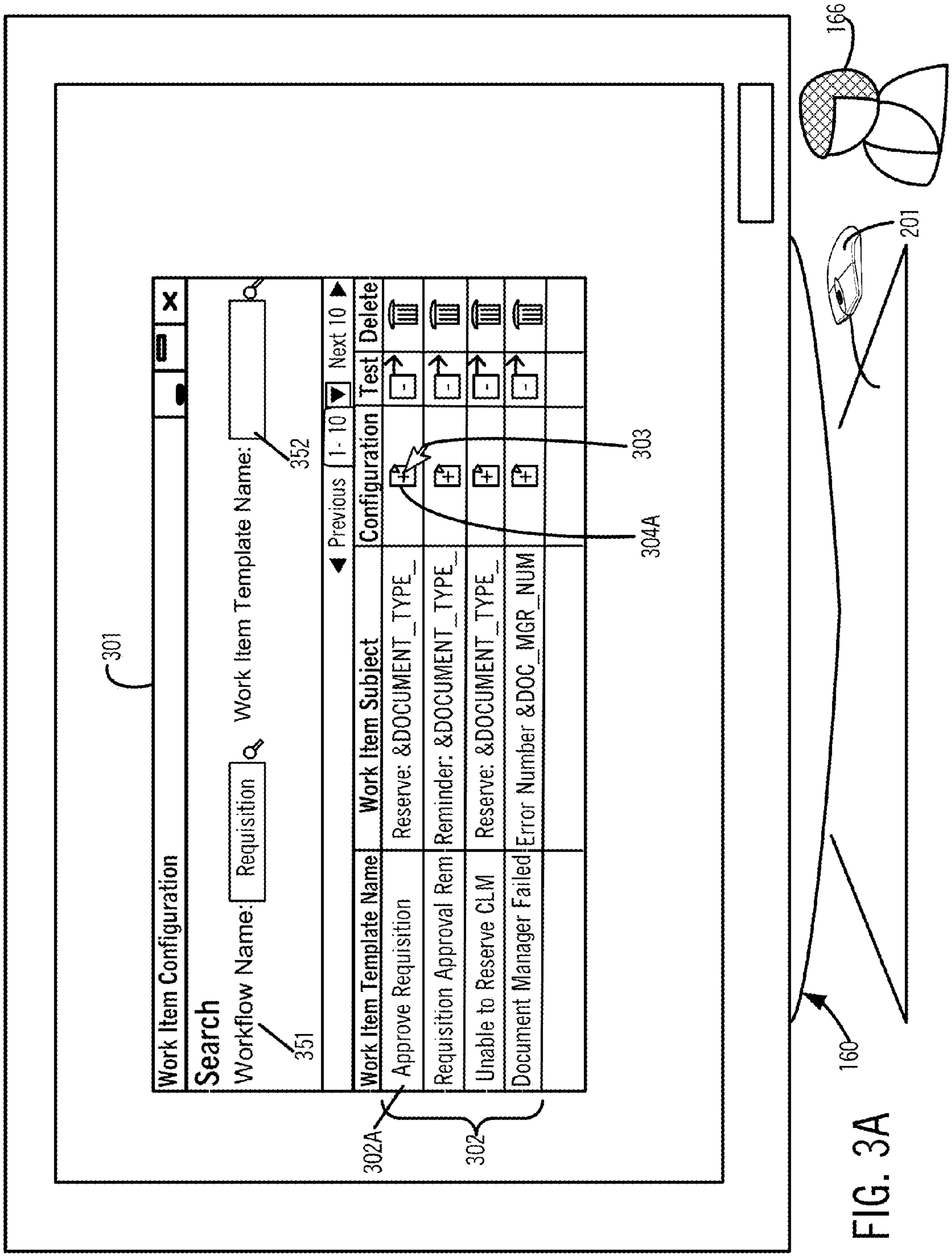
FIGS. 3A-3H illustrate screens generated by one or more computers 200 of FIG. 2 executing setup operation 130 of framework 100 in certain illustrative embodiments.

More specifically, in an act 101 (FIG. 1A), computer(s) 200 prepare and transmit one or more screen(s) to receive search criteria to identify templates of requests. For example, screen 301 illustrated in FIG. 3A enables receipt of search criteria in the form of a type of requests (e.g. workflow name 351) and/or template name (e.g. field 352). Thereafter, in act 102 (FIG. 1A), computer(s) 200 prepare and transmit a list of names of templates (e.g. list 161 in FIGS. 1C and 1F, list 302 in FIG. 3A) of request. Subsequently, in act 103 (which may be similar or identical to act 231 described below in reference to FIG. 2), computer(s) 200 receive a selected name of a request template, e.g. identifier of a request 162 (FIGS. 1C, 1F), name 302A (FIG. 3A).

Figure 3B:
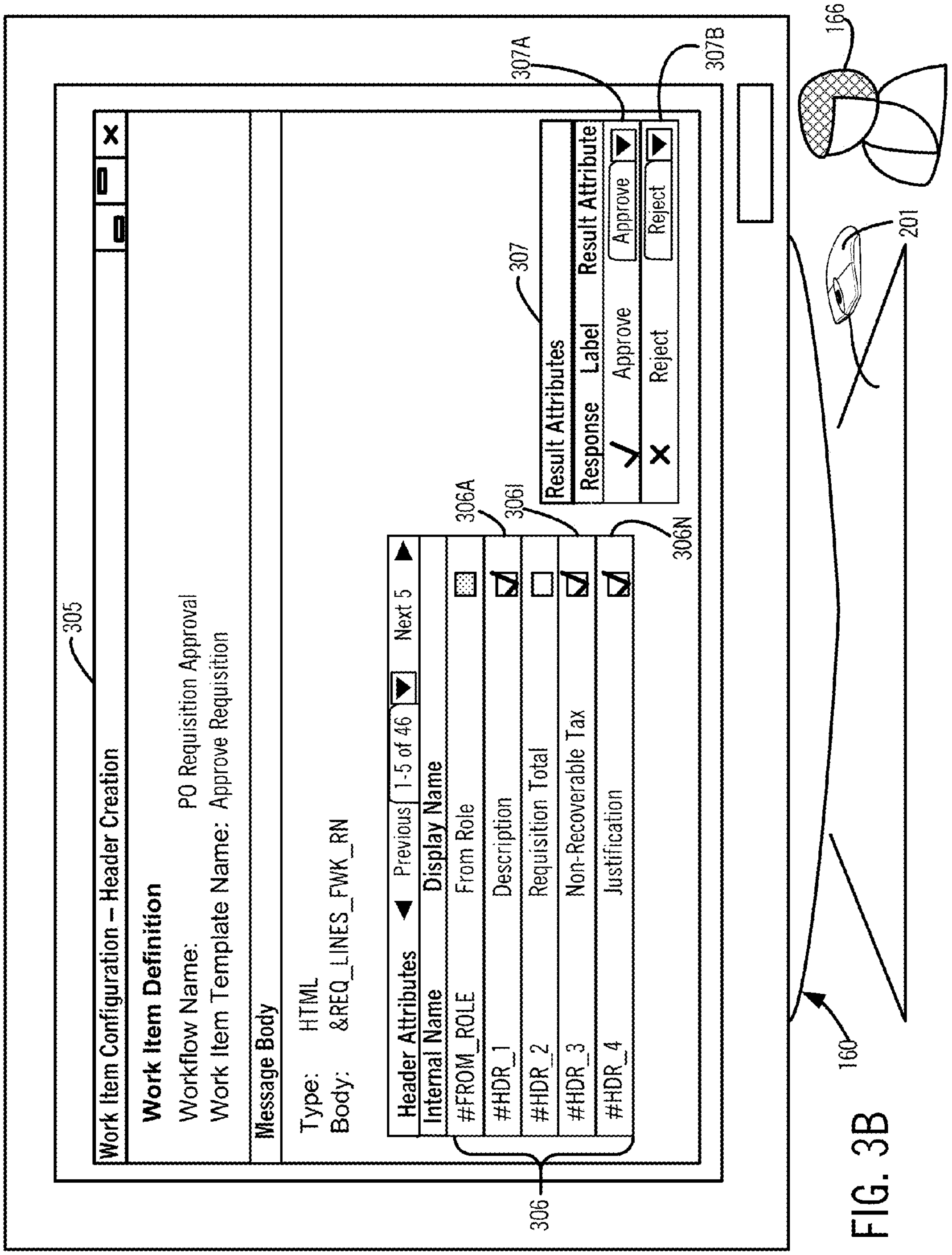

Thereafter, to enable configuration of the selected request, in act 104 (FIG. 1A), computer(s) 200 prepare and transmit one or more screen(s) (e.g. screen 162A in FIG. 1F, screen 305 in FIG. 3B) to receive selections identifying names of attributes (e.g. names #HDR_1, and #HDR_3 in FIG. 3B) that are selected (e.g. by a developer) from a larger plurality of names (e.g. see group 306 in FIG. 3B). The larger plurality of attribute names includable in a request header are extracted from columns of one or more tables of a relational database, e.g. tables 236 described below. Selections made in the just-described screen(s), e.g. screen 305, are received in computer(s) 200 e.g. as attribute identifiers 162B in FIG. 1F, and stored in configuration information e.g. in configuration tables 1120 (FIG. 1F) of the relational database, for subsequent use in runtime operation 140 in generating a header of the request being configured in operation 130 (FIG. 1A).

Thereafter, in act 105 (which may be similar or identical to act 233 described below), computer(s) 200 prepare and transmit one or more screen(s) (e.g. screen 163 in FIGS. 1C and 1F, screen 308 in FIG. 3C) to receive a set of identifiers (also called "region identifiers") of one or more regions (also called line item groups) that are includable in a content of the request. Configuration information received via the just-described screen(s), e.g. screen 308 (FIG. 3C), is received in computer(s) 200 e.g. as region identifiers 164 shown in FIGS. 1C, 1F and stored, e.g. in the relational database, for subsequent use in runtime operation 140 in generating content of the request being configured in operation 130.

Figure 3C:
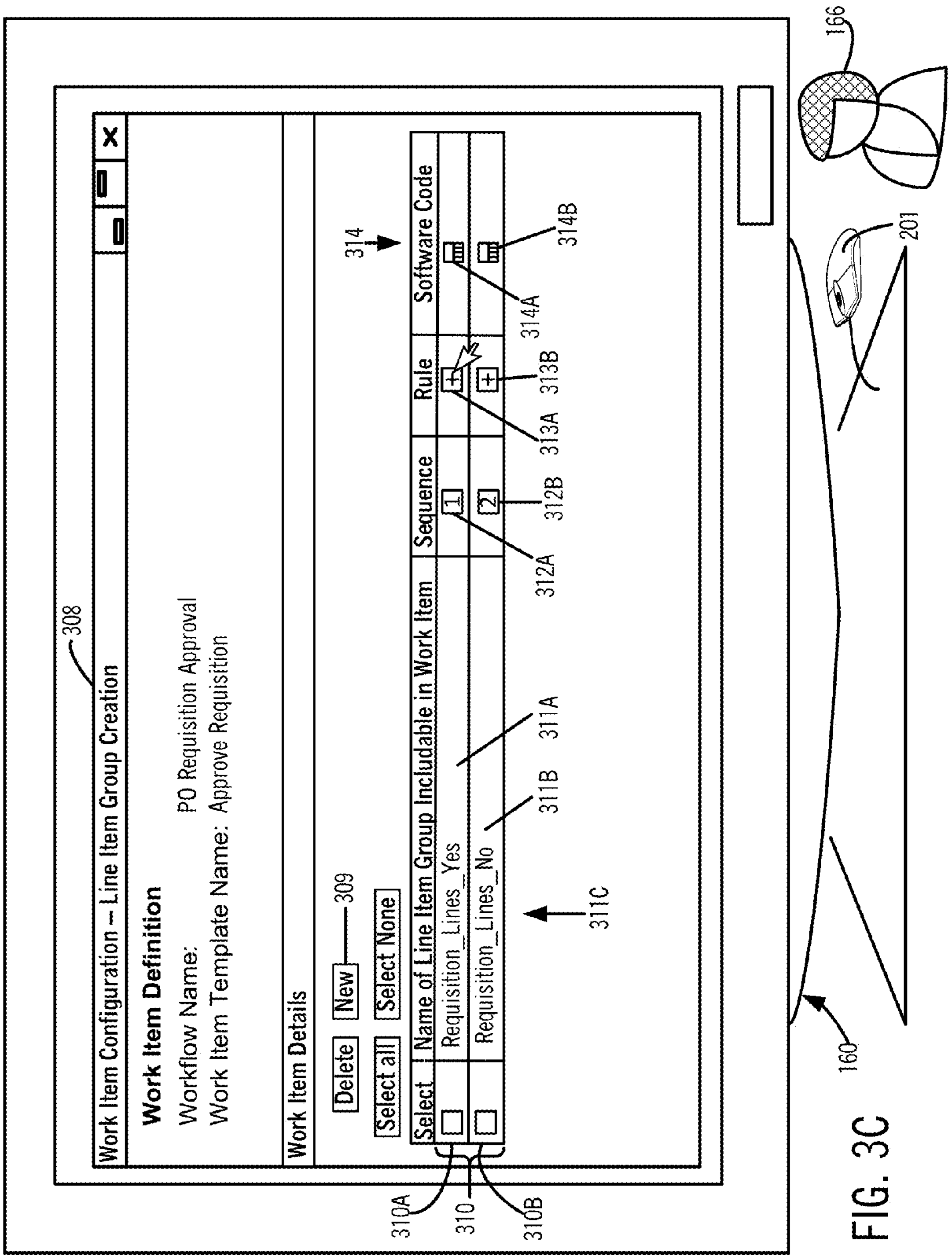

Thereafter, an act 106 (FIG. 1A) is repeatedly performed, for each includable region identified in act 105 (described above), e.g. similar or identical to act 234 described below. Specifically, in act 106 (FIG. 1A), computer(s) 200 receive information on a rule action pair corresponding to each includable region, wherein the rule action pair information comprises a definition of a rule and an identifier of a specific software code (or software code identifier) to be executed when the rule is satisfied. Rule action pairs may be identified in act 106 e.g. as described below in reference to buttons 313A and 314A, shown in a single row (also called "display row") for a region (or line item group) 310A (FIG. 3C). Information on a rule action pair is received in computer(s) 200 for each includable region, and stored in configuration information, e.g. in the relational database, for subsequent use in runtime operation 140 in generating content of the request being configured in operation 130.

Act 106 may include an act 107 that is repeatedly performed for each rule, wherein computer(s) 200 prepare and transmit one or more screen(s) (e.g. see subscreen 315 in FIG. 3D) to receive for each rule in a rule action pair being identified in act 106 (FIG. 1A), a definition of the rule which includes user input on selections identifying an operator, a type of operand, an operand and a constant, e.g. as described below. Furthermore, act 106 may also include a group of acts 108A-108C that are repeatedly performed for each action in a rule action pair, wherein computer(s) 200 prepare and transmit one or more screen(s) to obtain information needed to perform the action.

Figure 3D:
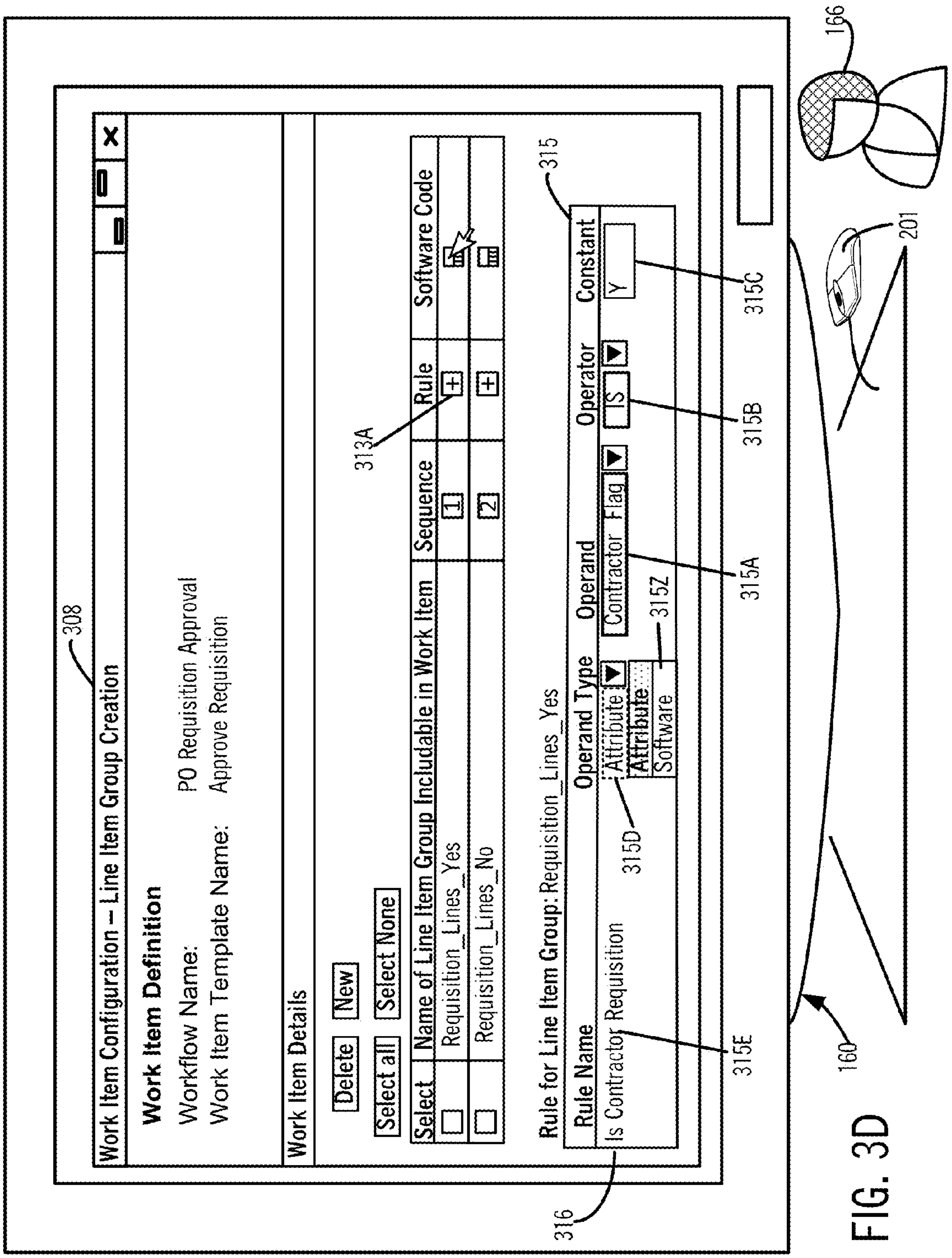
Figure 3E:
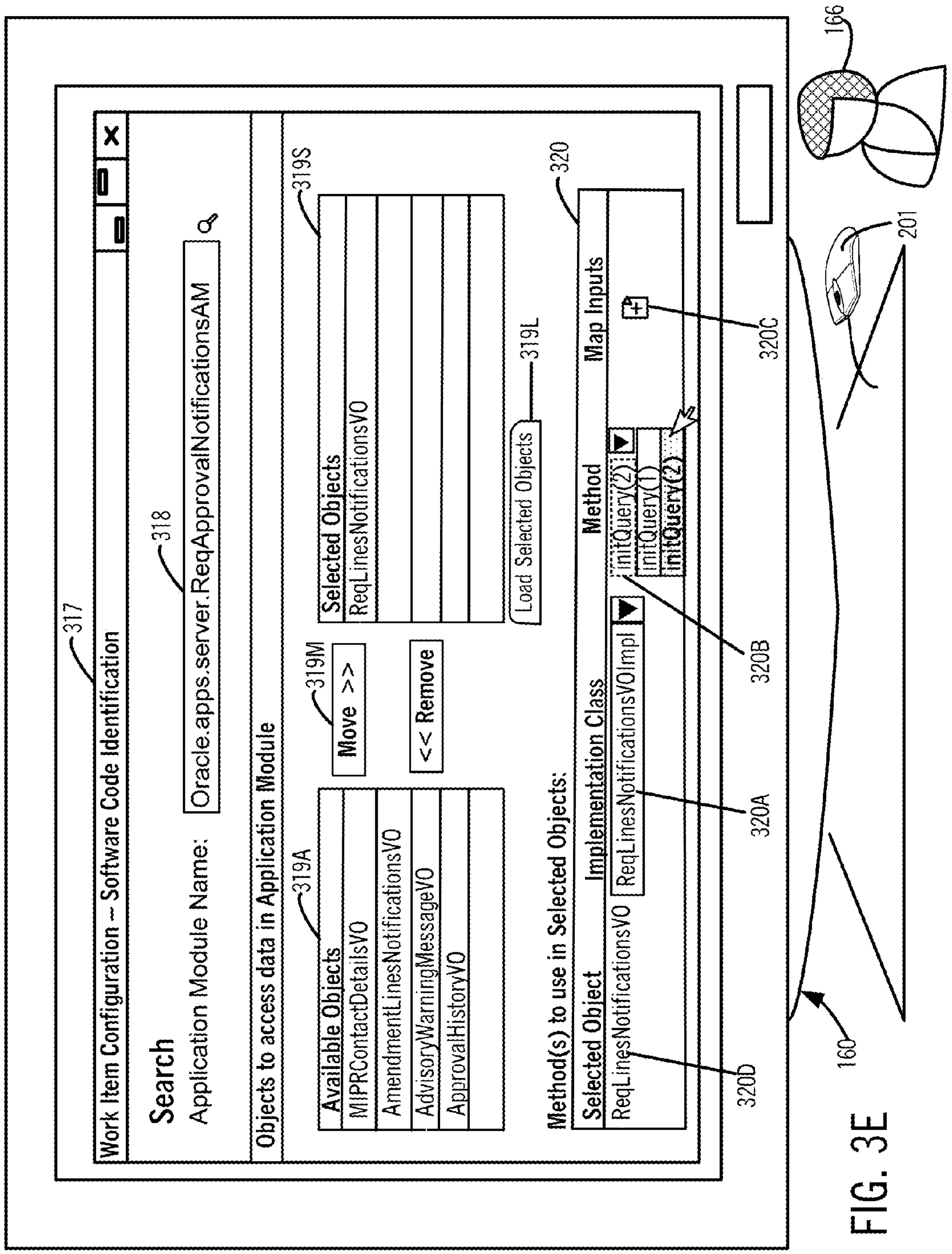

Specifically, in act 108A, computer(s) 200 may prepare and transmit screen(s) to receive, for each action in a rule action pair, selections identifying an application module, an object within the application module, and to receive as the identifier of the specific software code, a method (also called "action programmatic method", or simply "programmatic method") 320B within the object 320D, as illustrated by screen 317 shown in FIG. 3E, described below. Moreover, in act 108B, computer(s) 200 may prepare and transmit screen(s) to receive, a mapping between input parameters of a specific software code (e.g. identified in act 108A), and attributes of the request, e.g. as illustrated by table 323 shown in FIG. 3H, described below.

Figure 3F:
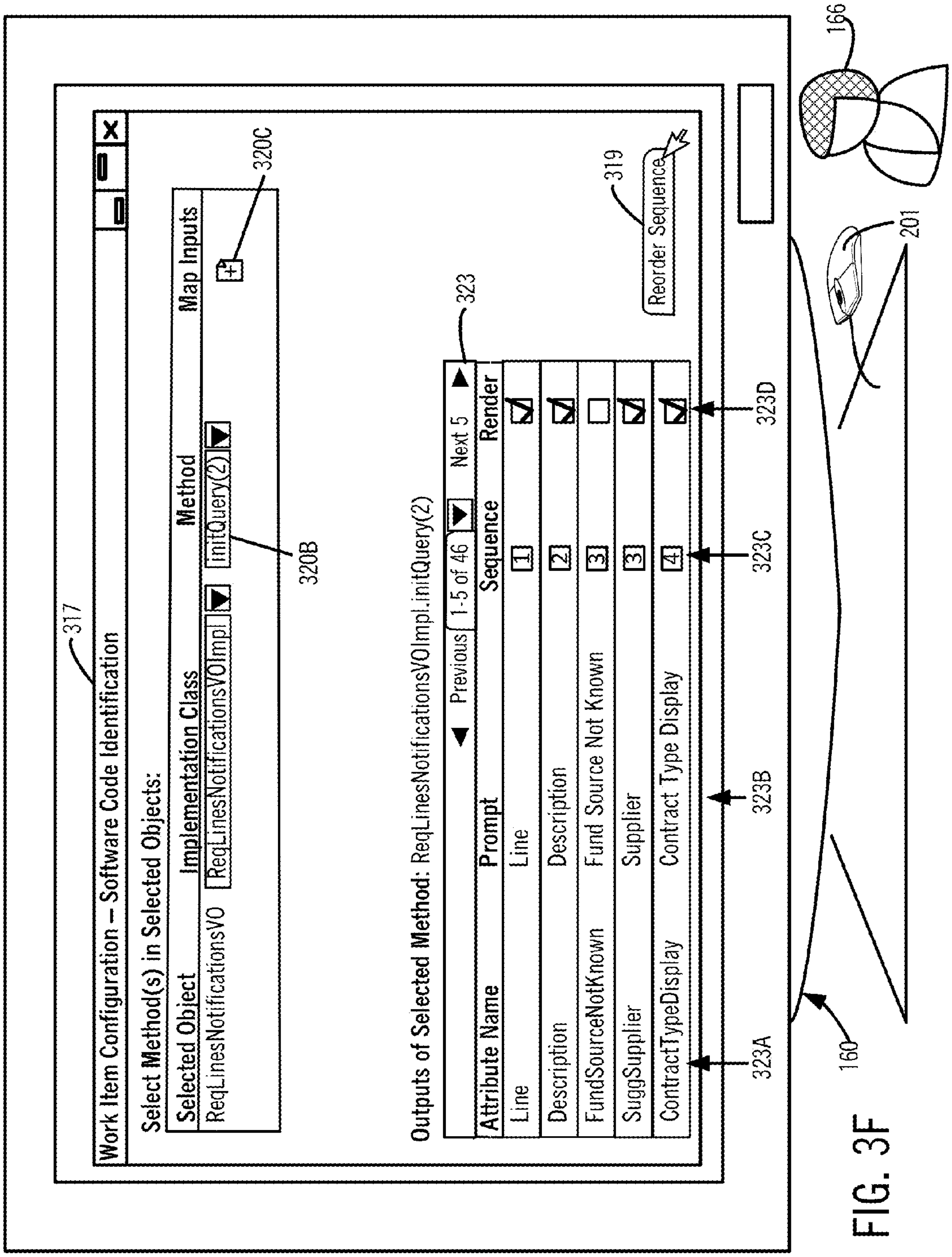
Figure 3G:
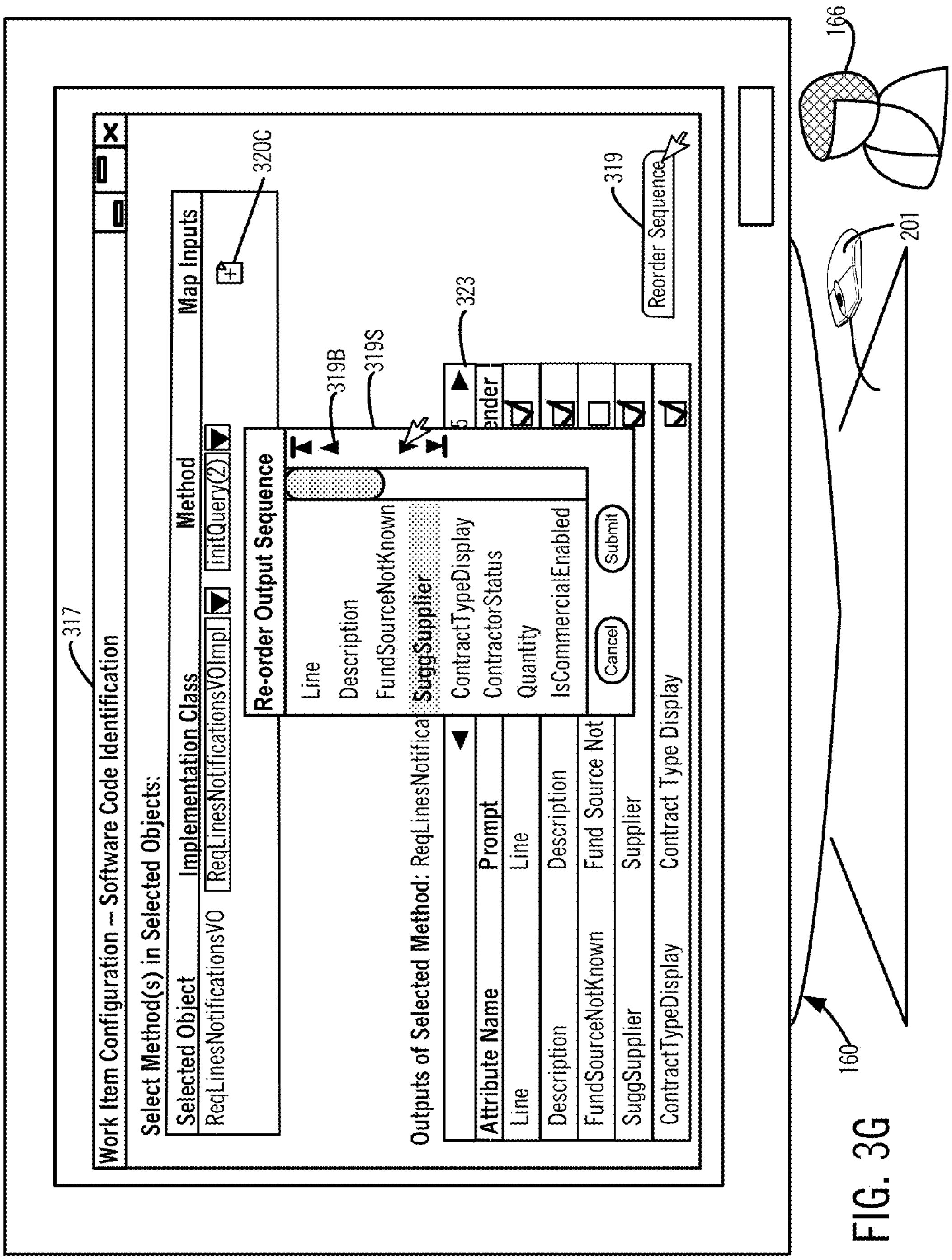

Furthermore, in act 108C, computer(s) 200 may prepare and transmit screen(s) to receive selections identifying names of attributes that are selected from a larger plurality of names of attributes output by an action programmatic method, and thus available for inclusion in content of a region in the request being configured (in a manner similar to attribute names selected for inclusion in the request's header, as described above in reference to act 104). Screens of act 108C used for selection of attribute names may be e.g. as illustrated in FIG. 3F (described below). In act 108C, the larger plurality of names may also be extracted from columns one or more tables of the relational database and/or based on output attributes of the specific software code identified in act 108A. Also in act 108C, computer(s) 200 may receive a specific sequence of the names selected for inclusion in the request's content (also identified in act 108C), e.g. as illustrated in column 323C in FIG. 3F and the sequence may be changed as described below in reference to FIG. 3G and button 319.

Act 107 for each rule and the group of acts 108A-108C for each action may be performed in any sequence relative to one another, so long as each rule and each action is specified in each rule action pair received in act 106. Note that a single action may be used in common with multiple rules, e.g. depending on the rule action pairs of the request being configured.

Before, during, or after act 106 (depending on selection by a developer), an act 109 (FIG. 1A) may be performed by computer(s) 200 to receive another sequence, in which two or more rules are to be evaluated, relative to one another, e.g. when multiple rule action pairs are defined in act 106, for the content of a single request. For example see sequence numbers 312A, 312B in FIG. 3C, described below.

Acts 101-109 (FIG. 1A) enable developers to declaratively implement different types of requests, by configuration in operation 130, following which runtime operation 140 performs one or more of acts 141-149 (FIG. 1B) to automatically generate requests of these different types, e.g. in response to messages from mobile device 170. Specifically, in act 141, computer(s) 200 may receive from a mobile device (e.g. mobile device 170 in FIG. 1C), a message that identifies a type of requests. The just-described request type identifies one or more templates that are used by a module in application software, to obtain and store in table(s) of a relational database, data related to requests transmitted to the module by computer(s) and/or mobile devices operated by humans (e.g. requesters). The just-described data related to requests is used by computer(s) 200 in runtime operation 140 to prepare header and/or content of requests, and to receive user input on each request indicative of at least one of approval or disapproval. The just-described data related to requests may be received by modules in application software in any manner, e.g. as user input received from requesters, followed by the modules storing in table(s) of the relational database, the just-described data and/or data derived therefrom (e.g. by execution of software code in the modules).

Accordingly, in act 142, computer(s) 200 retrieve from one or more database tables, information on requests that are instantiated by the module(s), based on a template that is at least partially identified by the request type (e.g. by request type (or workflow name) 351 in FIG. 3A). Specifically, in some embodiments, a request type (e.g. workflow name) of "Requisition" may completely identify a single request template such as the template of name 302A (e.g. labeled as "Approve Requisition" in FIG. 3A). However, in other embodiments a request type only partially identifies request templates, and in these embodiments multiple request templates are retrieved in act 142 (e.g. templates identified in list 302 which are named "Approve Requisition", "Requisition Approval Reminder", "Unable to Reserve CLM" and "Document Manager Failed" as shown in FIG. 3A). Thereafter, in act 143, computer(s) 200 prepare and transmit to mobile device 170, a summary (e.g. a list) of requests that are instantiated in the relational database, and identified based on the request type. Examples of request summaries are illustrated in (a) FIG. 8B for expense requests, (b) FIG. 8E for requisition requests, and (c) FIG. 8H for purchase order requests.

Thereafter, in act 144, computer(s) 200 receive from mobile device 170, a message that identifies a specific request in the summary (e.g. list). Then, in act 145, computer(s) 200 evaluate at least one rule in a rule action pair corresponding to at least one includable region identified in a set of region identifiers(s). The set of region identifiers are retrieved from configuration information, which may be e.g. retrieved from the relational database based on a template used to generate the request. When one or more evaluated rule(s) is/are found to be satisfied, one or more region(s) corresponding thereto are identified in computer(s) 200, as being renderable, in displaying the specific request.

In certain configurations ("first" configurations), there is only one rule ("first rule") that corresponds to a region ("first region") of a request, and there is only one region ("first region") that is identified for the request (in the set of regions), and this region ("first region") is identified as renderable when the rule ("first rule") is found to be satisfied. In other configuration ("second" configuration), multiple rules ("second rules") are configured for a single region ("second region") of a request, and there is only one region ("second region") identified for the request (in the set of regions), and this region ("second region") is identified as renderable, when any one of the multiple rules ("second rule") is found to be satisfied. In still other configurations ("third" configurations), several rules (Ni "third rules") are configured for each region i (i-th "third region") of a request, and there are multiple regions (e.g. 0<i<m "third regions") identified for the request (in the set of regions). In the third configurations, when any one of the third rules (e.g. one of Nj third rules) is satisfied for a specific third region (e.g. j-th third region), that specific third region (e.g. the j-th third region) is identified as being renderable In the third configurations, more than one region (e.g. i-th and j-th regions) may be identified as being renderable, when a corresponding rule is found to be satisfied (e.g. one of the Ni third rules is found to be satisfied, and one of the Nj third rules is also found to be satisfied).

Accordingly, for each to-be-rendered region identified in act 145, computer(s) 200 perform acts 146 and 147, as follows. In act 146, computer(s) 200 execute at least a specific software code that is identified in configuration information, in a rule action pair corresponding to the to-be-rendered region identified by evaluation (in act 145). The specific software code, on execution, returns one or more rows ("first rows", or "data rows"), each row including multiple name value pairs. In embodiments wherein the first rows are retrieved from a relational database, the names in the multiple name value pairs are implemented as columns in one or more tables of the relational database.

Thereafter, in act 147, computer(s) 200 prepare at least a portion of content of the specific request identified in act 144, by formatting the multiple name value pairs that were identified in act 146 into corresponding multiple lines ("display lines") in a row ("second row", or "display rows") of a to-be-rendered region identified in act 145. In the just-described multiple display lines, each name value pair among the multiple name value pairs is included in a single display line of the to-be-rendered region. As noted in the last sentence of the previous paragraph, the just-described multiple name value pairs may be received in a single data row, corresponding to multiple columns in a database table, from which the multiple name value pairs are extracted. The number of second rows ("display rows") which are prepared, for a single to-be-rendered region in act 147, depends on a corresponding number of first rows ("data rows") that are returned by execution of the specific software code (which in turn may correspond to, e.g. rows (also called "database rows") returned by execution of a database query). Moreover, for use in display by mobile device 170, multiple lines ("display lines") within each row ("display row") of the to-be-rendered region are sequenced relative to one another, in a specific sequence that was received as user input from one or more developers, e.g. in act 108C of setup operation 130. For example, see the "attribute order" with sequence numbers 1-8, in the corresponding eight display lines, such as lines 814A-814H in FIG. 8G (in turn corresponding to eight XML statements 601A-601H, starting with the XML tag <attribute . . . > and ending with the XML tag </attribute>, all within a single display row 601 in FIG. 6B), whereby the eight display lines 814A-814H are sequenced relative to one another in the specific sequence, which is received during setup operation 130 as user input from a developer, as shown in FIG. 3F.

After content for each to-be-rendered region has been generated (by performing acts 146 and 147, and repetition thereof if necessary), computer(s) 200 transmit to the mobile device 170, a header and content of the specific request identified in act 144, followed by act 149 in which user input is received and stored, e.g. in the relational database. Thereafter, computer(s) 200 may return to act 144 (described above).

Figure 7A:
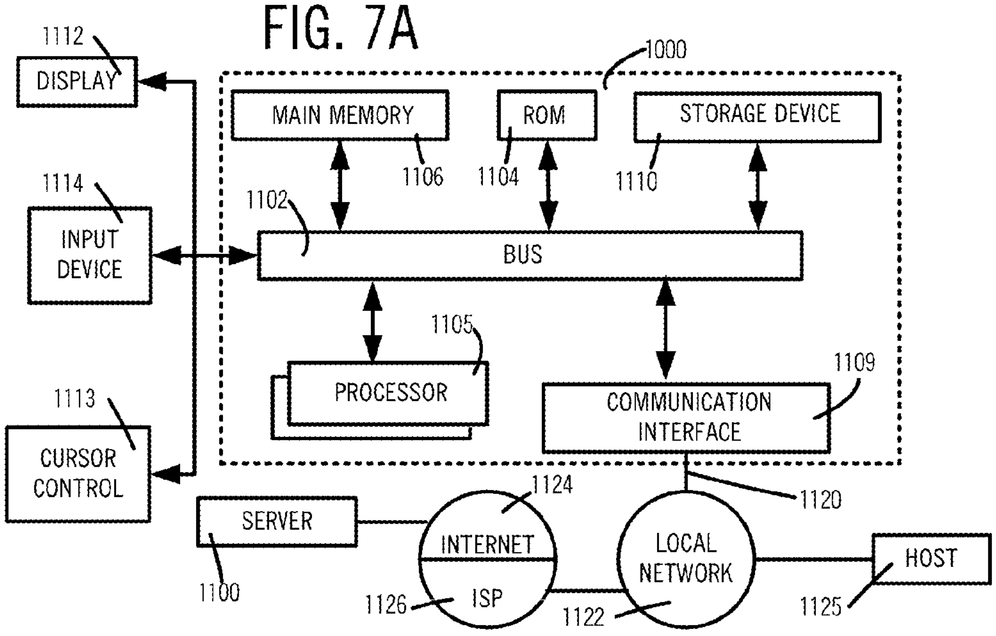
FIGS. 7A and 7B illustrate, in block diagrams, hardware and software portions of one or more computers 200 that perform one or more acts illustrated in FIG. 2 and in FIGS. 4A-4C and 5A-5D in some embodiments.

In several aspects of described embodiments, one or more computers 200 process a request 177 (FIG. 1C) by assembling content to be rendered therein. Request 177 is typically created by a software application 150 (FIG. 1C) in the one or more computer(s) 200 each of which may be implemented as computer 1000 including one or more hardware components as illustrated in FIG. 7A and/or software components illustrated in FIG. 7B and discussed below. Request 177 is typically created by application module(s) 151, 152 (FIG. 2) of software application 150 in computer(s) 200 in response to user input received by client computer(s) 182, 186 (FIG. 1C), e.g. from requester(s) 181, 185. For example, requester 181 may use a desktop computer 182 to create a request 183 (FIG. 1C), e.g. for reimbursement of expenses by use of a reimbursement module 151 which is a business application in enterprise resource planning (ERP) software 150 executed in one or more computers 200.

Similarly, requester 185 may use a desktop computer 186 to create another request 187 (FIG. 1C), e.g. for making a requisition, by use of a requisition module 153 in ERP software 150 (implementing an application of some embodiments). Requests 183 and 187 may be created via browsers (such as INTERNET EXPLORER or FIREFOX) in computers 182 and 186 that display screens (not shown) generated by corresponding modules 151 and 152 of software application 150, in the normal manner. Each of computers 182 and 186 may be implemented as computer 1000 including one or more hardware components as illustrated in FIG. 7A and/or software components illustrated in FIG. 7B and discussed below.

Requests 183 and 187 are stored by execution of software application 150 in a relational database 1120 as data in corresponding rows ("database rows") in one or more tables, such as one database row for a request 177. The one or more computers 200 may assemble request 177 to include a header 173 to be displayed initially (FIG. 1D), followed by content in the form of one or more groups 174 of line items 174A-174N (FIG. 1E). An approver 176 (FIG. 1C) may select request 177 for display on mobile device 170 in a normal manner, e.g. by selecting it in a list (see FIGS. 8B, 8E and 8H) of multiple requests requiring approval. Mobile device 170 may be implemented to include specialized circuitry such as GPS circuitry, cellular phone circuitry and sensors, as well as computer 1000 in turn including one or more hardware components as illustrated in FIG. 7A and/or software components illustrated in FIG. 7B and discussed below.

Figure 1D:
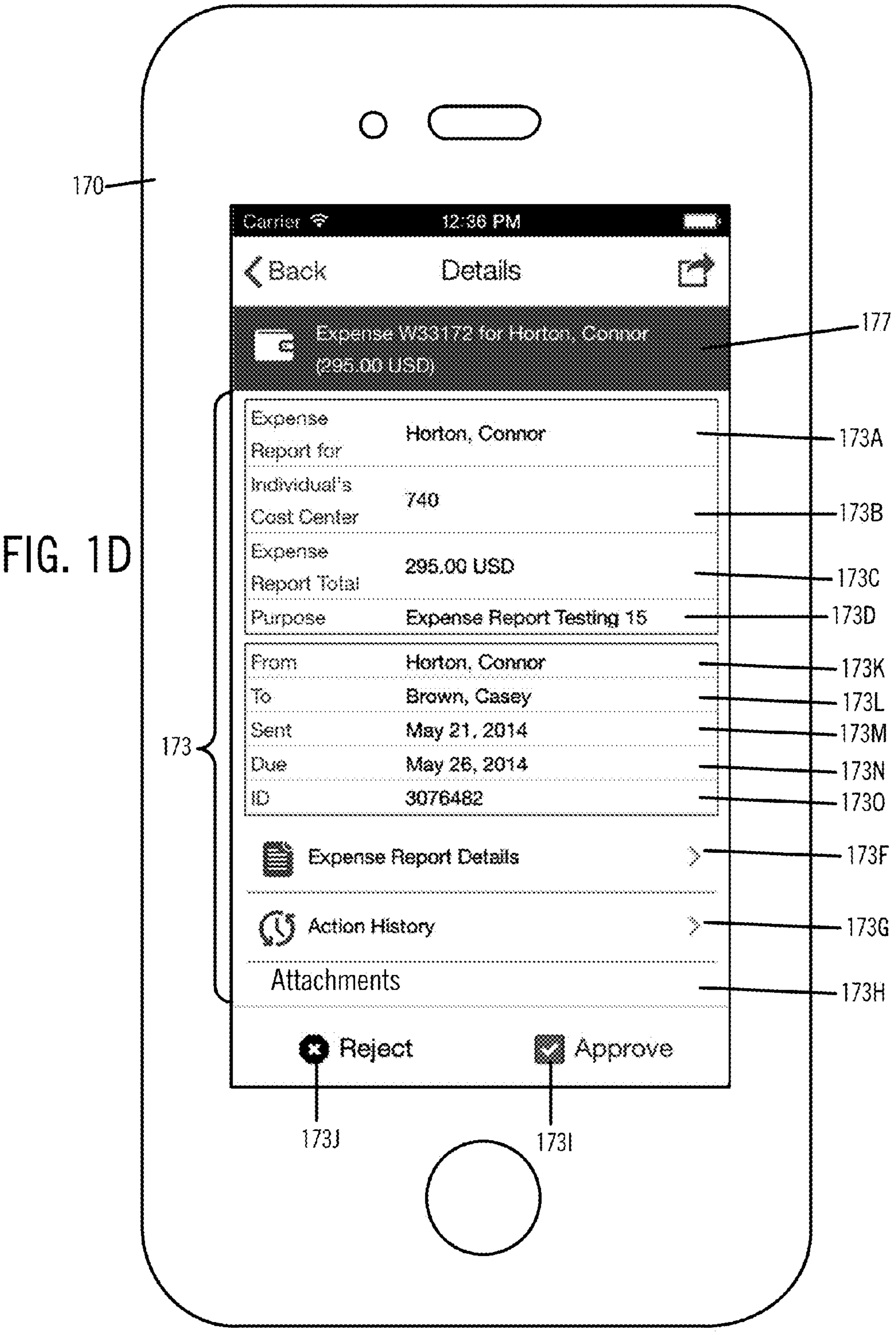
FIGS. 1D and 1E illustrate a mobile device 170 of FIG. 1C configured to display a work item's header and content respectively.
Figure 1E:
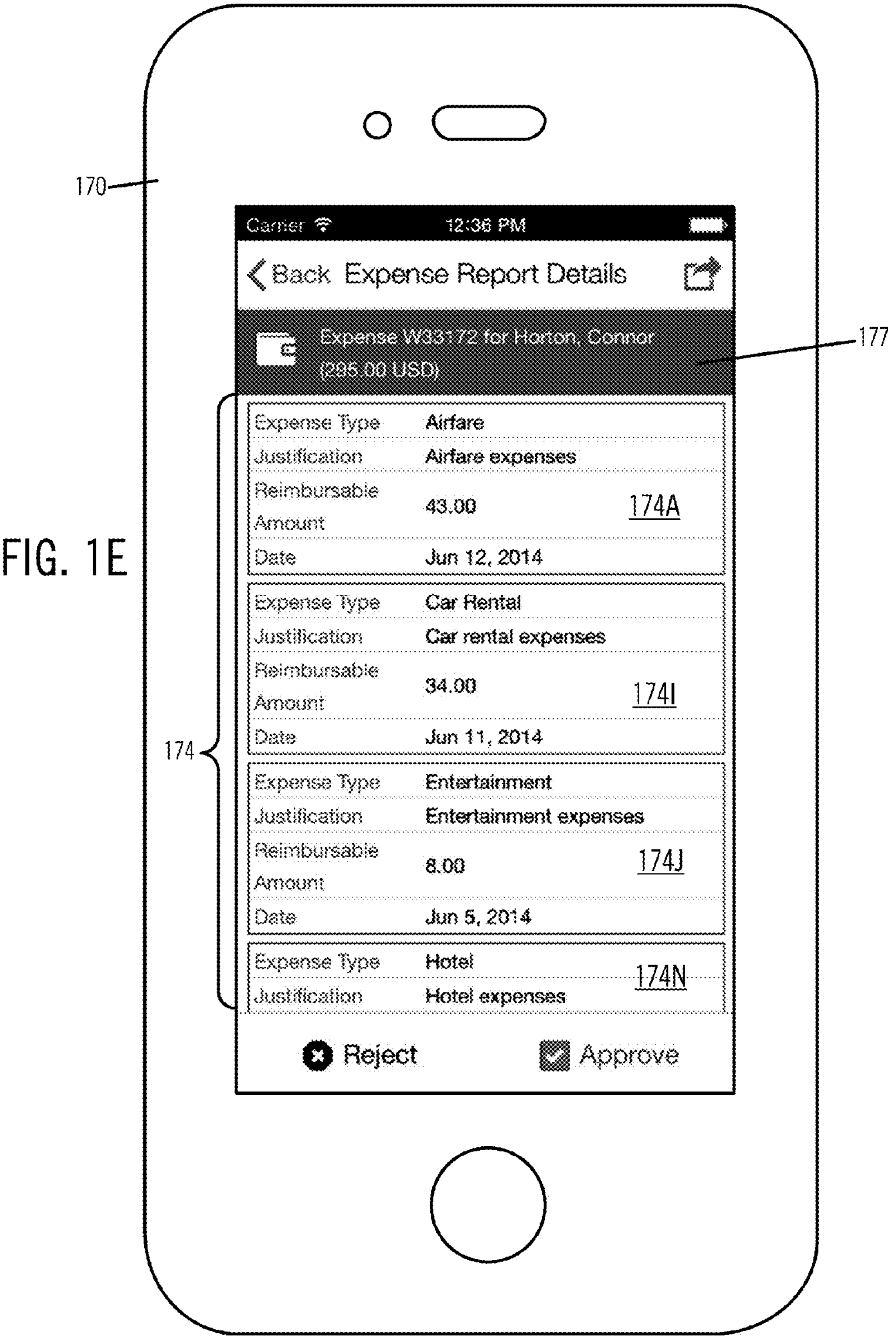

When selected, header 173 of request 177 may initially be displayed on mobile device 170 (as shown in FIG. 1D). Header 173 includes one or more attributes in the form of name value pairs. In the example illustrated in FIG. 1D, header 173 includes attributes specific to a module that created the request 177, such as attribute 173A with the name "Expense Report for" and value Horton, Conor, attribute 173B with the name "Individual's Cost Center" and value 740, attribute 173C with the name "Expense Report Total" and value 295.00 USD, attribute 173D with the name "Purpose" and value "Expense Report Testing 15". In addition, header 173 includes attributes that are generic to requests (e.g. independent of which module created the request 177), such as attribute 173K with the name "From" and the value "Horton, Connor", attribute 173L with the name "To" and the value "Brown, Casey", attribute 173M with the name "Sent" and the value "May 21, 2014", attribute 173N with the name "Due" and the value "May 26, 2014", attribute 173O with the name "ID" and the value "3076482".

Header 173 shown in FIG. 1D includes an attribute 173F with the name "Expense Report Details" and the value is a link that is operable by user input to display a screen displaying a group 174 of line items (also referred to as a region), with each line item being indicative of a specific expense as illustrated in FIG. 1E. Header 173 shown in FIG. 1D includes another attribute 173G with the name "Action History" and the value is another link that is operable by user input to display another group of line items (also referred to as another region, not shown), which identify an action previously taken on the current request 177, and may include a time stamp, showing a specific date and a specific time (on the specific date), when the action was taken. Similarly, an optional header attribute 173H identifies yet another group of line items (also referred to as yet another region) also selectable by user input, to reveal one or more attachments e.g. a restaurant receipt which may be included in a request (e.g. work item) by a requester (e.g. employee). Each group of line items (or each region) may include just one line item, or multiple line items. In some embodiments, a group (or region) in which there are no line items is not transmitted by runtime operation 140 to mobile device 170 (i.e. effectively non-existent). Accordingly, the just-described last three header attributes 173F, 173G and 173H identify three groups of line items (or three regions) of request 177.

Individual line items 174A . . . 174I . . . 174J . . . 174N (FIG. 1E) are transmitted by runtime operation 140 to mobile device 170, e.g. as content of request 177. Hence, when header attribute 173F is selected by user input touching the panel thereof, a header displayed by mobile device 170 in FIG. 1D (e.g. displayed based on receipt of XML to render a header screen as shown in FIG. 6A) is replaced by a display of individual line items 174A-174N identifying corresponding expenses, as shown in FIG. 1E (e.g. displayed based on receipt of XML to render a details screen as shown in FIG. 6B). For illustrative purposes, only four line items are shown in FIG. 1E, although there may be any number of such line items. As illustrated in FIG. 1E, each of line items 174A-174N includes several name value pairs. For example, line item 174I has four name value pairs, as follows: a first name "Expense Type" and a first value "Car Rental", a second name "Justification" and a second value "Car rental expenses", a third name "Reimbursable Amount" and a third value "34.00 USD", a fourth name "Date" and a fourth value "Jun. 11, 2014." Values in each of the just-described four name value pairs are received by reimbursement module 151 (FIG. 1C), as user input in a request 183 from employee 181, and stored in database 1120 as attributes.

Thus, numerous such line items are present in database 1120, and the specific line items 174A-174N which are selected by runtime operation 140 (FIG. 1C) for inclusion in content 174 of a request 177 is configurable in accordance with the invention, by a rule 165A (FIG. 1C), as noted above. Rule 165A is configurable by user input from a client computer 160 of a human (e.g. developer 166) and is associated with an identifier 165B (FIG. 1C) of a software code to be executed to render a group of one or more line items (also called "regions") when rule 165A is satisfied. Rule 165A and software code identifier 165B together form a rule action pair 165 (FIG. 1C), which corresponds to a line item group (e.g. group 173F in FIG. 1D) that is includable in a request 177. Specifically, in a setup operation 130, a framework 100 (FIG. 1C) receives from developer 166 via his/her client computer 160, user input identifying configuration information for each request 177 that may be displayed on mobile device 170. The configuration information identifies one or more line item groups 173F that is/are includable in a request 177 and one or more corresponding rule action pairs 165 to be used in conditionally rendering the includable line item groups 173F. Client computer 160 may also be implemented as computer 1000 including one or more hardware components as illustrated in FIG. 7A and/or software components illustrated in FIG. 7B and discussed below.

Thereafter, in a runtime operation 140, on receipt of a request identifier 172 (FIG. 1C) identifying a specific request 177 (e.g. selected by user input from among a list of requests), framework 100 evaluates the rules corresponding to each line item group that is includable in the identified request 177, to identify one or more line item groups 174 which are to be rendered (when their corresponding rule is found to be satisfied). Then, for each to-be-rendered line item group 174, framework 100 executes (or initiates execution of) a software code identified in the rule action pair 165, to obtain from a database 1120 one or more line items 174A-174N in group 174, each retrieved line item including one or more name value pairs. The name value pairs in each retrieved line item 174I are transmitted as content of request 177, in addition to a header 173, to obtain user input indicative of approval or disapproval of request 177.

Examples of tables in relational database 1120 are of two types, namely (a) pre-existing tables namely Work Item Templates, Workflow Attributes, and Work Items, and (b) configuration tables namely Configured Work Items, Header Attributes, Result Attributes, Line Items, Rules & software codes, Line Item attributes, and programmatic method parameters mapping. For example, attributes (such as Workflow Attributes, Header Attributes, Result Attributes) may be stored as name value pairs, wherein the names in name value pairs are implemented as columns in a relational database table, and the values in the name value pairs may be stored in the rows ("database rows") of the relational database table, in database 1120.

Figure 1F:
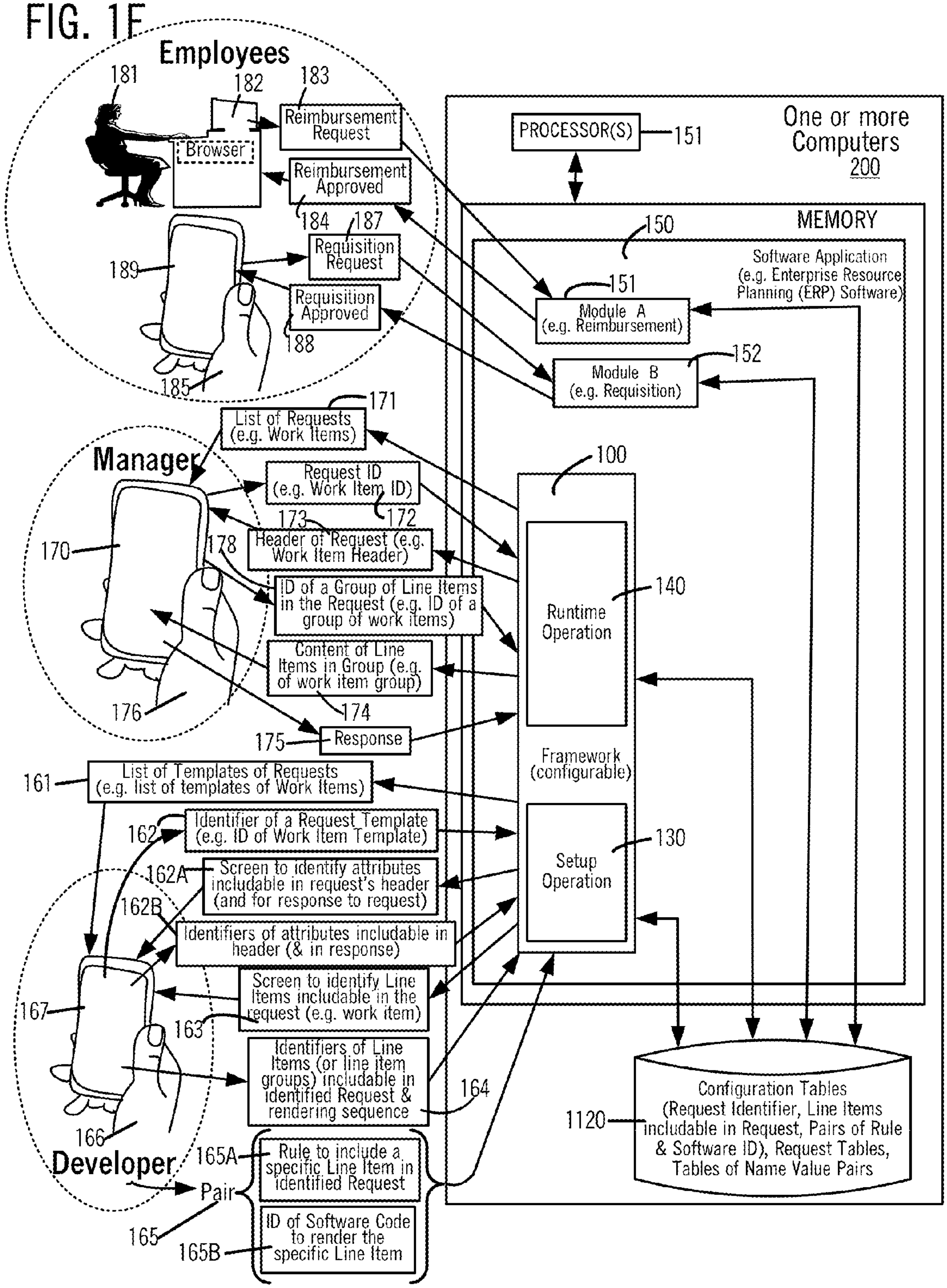
FIG. 1F illustrates, in a data flow diagram similar to FIG. 1C, configuration of a framework that supports use of a mobile device 167 configured for use by a developer, and further supports use of another mobile device 189 configured for use by an employee in additional embodiments also in accordance with the invention.

A work item is just one illustrative example of a request 183 (FIG. 1C) used in a software application 150 (FIG. 1C) which happens to be implemented as enterprise resource planning (ERP) software illustrated in FIG. 1F. As another example, software application 150 (FIG. 1C) may be implemented in some embodiments as gaming software (not shown), wherein a request 183 may contain a token (not shown) submitted by a team member (who is a requester) to a captain (who is an approver), and the token may identify a specific weapon in an armory (not shown) when the specific weapon is needed by the team member for use in the game only. Thus, FIG. 1C generically illustrates several embodiments in accordance with the invention, while FIG. 1F more specifically illustrates in greater detail certain specific exemplary embodiments.

Although desktop computer clients 181 and 186 are shown for illustrative purposes in FIG. 1C as being used by employees 181 and 185 to interface with modules 151 and 152 to generate data for work items (based on requests 183, 187), such an employee 185 may instead use a mobile device 189 to perform the same acts, as illustrated in FIG. 1F. Similarly, desktop computer 160 in FIG. 1C is used by developer 166 to interface with framework 100 to provide configuration information for conditional execution of a specific software code (when an associated rule is met) to process a work item based on line items includable therein.

Such a developer 166 may instead use a mobile device 167 to perform the same acts, as illustrated in FIG. 1F.

Moreover, although request 177 transmitted by framework 100 to mobile device 170 includes two portions 173 and 174 thereof in a single message as illustrated in FIG. 1C, such portions may be transmitted individually as illustrated in FIG. 1F. Specifically, a request's line item group 174 may be transmitted by framework 100 to mobile device 170 in response to receipt of a region identifier 178 that identifies the line item group 174. Region identifier 178 (FIG. 1F) may be received by mobile device 170 as one value in the name value pairs received in header 173, and this one value identifies line item group 174 in a link operable by user input (as described above in reference to FIG. 1D). Also, header 173 is optional and may or may not be transmitted by framework 100 to mobile device 170 prior to transmission of a work item's line item group 174 as content therein. Accordingly, numerous such embodiments in accordance with the invention will be readily apparent in view of this detailed description.

Some embodiments of computer(s) 200 perform setup operation 140 after performance of one or more legacy operation(s), such as operation 210 (FIG. 2) to install one or more applications, each of which may include one or more software code(s), such as reimbursement module 151 and requisition module 153 (FIG. 1C). Operation 210 creates (and/or receives) templates 211 (FIG. 2) to be used in instantiating work items, during execution of module(s) 151, 152. Templates 211 are identified by unique names (also called work item template names), and in several embodiments it is one of these names that is received from developer's computer 160 (FIG. 1C) in an act 231 (FIG. 2) by setup operation 130. In such embodiments, prior to act 231, setup operation 130 transmits to developer's computer 160 (FIG. 1C), a list 302 (FIG. 3A) of names of work item templates e.g. as illustrated by screen 301 (FIG. 3A). Templates 211 may be partially identified by workflow names corresponding to respective modules, e.g. workflow name 351 of value "Requisition" (FIG. 3A) identifies one or more templates that are used by requisition module 153 in ERP software 150 (to obtain and store in a database, data related to work items). Developer 166 operates a mouse 201 (FIG. 3A) to place cursor 303 on a button 304A to identify the work item template to be configured and on clicking the mouse 201, developer's computer 160 transmits work item template name 302A to setup operation 130, which is received in act 231 as noted above.

List 302 (FIG. 3A) may be generated by setup operation 130 (FIG. 2) in response to a search, e.g. on a workflow name "Requisition" as illustrated in FIG. 3A. A workflow name identifies a process (also called "business process") that is followed by an instantiation of a work item template (also called work item) during its lifecycle, from creation to completion, including interactions with one or more humans (e.g. employees 181, 185) and/or other processes (e.g. of modules 151, 153). A work item's interactions with business processes and/or humans may create and/or complete other work items. A search to generate list 302 may identify other criteria, e.g. work item template's name, also illustrated in FIG. 3A. Thus list 302 may be generated in different ways in different embodiments, and developer 166 selects a work item name 302A identified in the search results list, and thus template name 302A is received in act 231 (FIG. 2). Note that in alternative embodiments, screen 301 may provide an input box for developer 166 to provide user input (by typing on a keyboard) in the form of a string of characters which define a new template name for a work item.

In an act 232 of operation 130, identifiers (also called "attribute identifiers") of one or more attributes ("header attributes") 306A . . . 306I . . . 306N in the template named in act 231 are received for use in rendering the header of the work item, on being selected by developer 166 as renderable, e.g. by selection (in check boxes) from among a group of attributes 306 in screen 305 as illustrated in FIG. 3B. The group of attributes 306 may include one or more attributes (such as the attribute with name "#FROM_ROLE") that are not selectable for inclusion, which are included in the work item's header 173 by default. Each of the just-described attributes in group 306 includes both an internal name (e.g. "#FROM_ROLE") and a display name (e.g. "From Role"). It is the just-described display name which is included as the name in a name value pair, when request 177 is processed to generate header 173 (FIG. 1C) which is returned by runtime operation 140.

Also, act 232 may receive identifiers (also called "attribute identifiers") of additional attribute(s) ("result attributes") 307A and 307B, on being identified by developer 166 as being associated with corresponding labels, by selection in drop-down list boxes of screen 305 (FIG. 3B). It is the just-described result attributes 307A and 307B which contain an approver's response 175 (FIG. 1C) to approve or reject the work item, e.g. by touching button 1731 or button 173J displayed on mobile device 170 (FIG. 1D). Note that act 232 is optional because in some embodiments the information described above as being received in act 232 is not accessible to developer 166, e.g. hard coded or preconfigured ahead of time.

After receipt of a work item template's name in act 231 (FIG. 2) and optional receipt of header and result attributes in act 232, another act 233 is performed in setup operation 130 to receive a set of identifiers (also called "region identifiers") of one or more groups 310A, 310B (FIG. 3C) of line items that are includable in the work item template identified in act 231. Groups (also called 'regions') 310A, 310B may be identified by corresponding names 311A, 311B, e.g. "Requisition_Lines_Yes" may be received by user input (e.g. via a keyboard) as name 311A in a field of a line in screen 308 (FIG. 3C). Screen 308 is supplied to client computer 160 by setup operation 130, and each of the lines for corresponding groups 310A, 310B (FIG. 3C) may be generated by developer 166 clicking on a new button 309 in screen 308. Each of the lines for groups 310A, 310B in screen 308 identifies, in addition to the just-described name, a sequence number 312A, 312B according to which the groups are to be processed, relative to one another.

For each of groups 310A and 310B that are identified in act 233, setup operation 130 receives at least one rule action pair in an act 234. Certain embodiments enable a single line item group to be associated with multiple rule action pairs, so that the same line item group may be rendered differently in a request (e.g. work item) 177 by performance of different actions when different rules are satisfied. In such embodiments, the names in column 311C need not be unique, i.e. the same name of a specific line item group may occur multiple times when multiple rule action pairs are associated therewith. However, some embodiments limit each line item group to being associated with only one rule action pair, so that each name in column 311C is required to be unique.

Moreover, a rule action pair received in act 234 may be received from client computer 160 either in a common message in which the set of region identifiers of one or more groups 310A, 310B are also received in act 233 or in separate messages depending on the embodiment. In some embodiments, developer 166 may click on a button 313A shown in screen 308 in the line for group 310A (FIG. 3C) to define a rule by identifying an operator, an operand and a constant as illustrated in FIG. 3D and described below. The developer 166 may further click on another button 314A in the same line for group 310A (FIG. 3C) to define an action to perform by identifying a specific software code, as described below in reference to FIGS. 3E-3H.

In some embodiments, developer 166 clicks on button 313A (FIG. 3C) in a rule column of screen 308 to obtain a screen 315 (FIG. 3D). Screen 315 is displayed in an illustrative embodiment as a portion of screen 308 at the bottom thereof, and includes an first field 315A to receive user input identifying an operand, a second field 315B to receive user input identifying an operator, and a third field 315C to receive user input identifying a constant. The constant is received in field 315C as a string of characters (e.g. via a keyboard). The operator is received in field 315B as a selection from among a set of predefined operators that are displayed in a drop-down list box (not shown) which is displayed by clicking an arrow icon on the right side of field 315B. The operand is received in field 315A also as a selection from among a set of operands that are displayed in another drop-down list box (not shown) which is displayed by clicking the arrow icon on the right side of field 315A.

The set of operands which are displayed in field 315A (FIG. 3D) for selection by developer 166 depend on a type of operand identified in another field 315D. The type of operand is received in field 315D also as another selection from among a set of operand types that are displayed in yet another drop-down list box which is displayed by clicking the arrow icon on the right side of field 315D. As shown in FIG. 3D, the set of operand types includes "attribute" as one operand type and "software" as another operand type. Selection of the "attribute" operand type in field 315D (FIG. 3D) results in the set of attributes being made available for selection in field 315A to include, in some embodiments: attributes related to the work item, attributes related to a work flow of the work item, and optionally attributes related to a module that created the work item.

Selection of the "software" operand type in field 315D results in field 315A being available for user input identifying the operand to be output of a software code ("rule-operand software code"), such as (1) output of a method ("rule-operand programmatic method") in an application (not shown) which may be expressed in any programming language such as Java, C++, and/or (2) output of PL/SQL code containing a query to a relational database which may be expressed in the structured query language SQL. Subscreen 315 (FIG. 3D) includes a field 315E to receive user input as a string of characters (e.g. via a keyboard) identifying a name of rule 316, such as the name "Is Contractor Requisition." Although only one rule 316 is shown in table 315 in FIG. 3D for the line item group "Requisition_Lines_Yes", multiple such rules may be configured in table 315 for the same line item group, and during runtime operation 140 whichever rule is satisfied that rule's action is performed.

In some embodiments, developer 166 clicks on button 314A (FIG. 3C) in software code column 314 of screen 308 to obtain a screen to identify an action to be performed, e.g. by execution of a specific software code identified by button 314A which may be implemented as a database query expressed in a structured query language (SQL) and/or any other programming language, such as Java, PL/SQL or C++ identified in a screen 317 as described below. Note that the specific software code ("action software code") identified by button 314A (FIG. 3C) which is to be executed in an action (selected as shown in FIG. 3E) of a rule action pair is different from another software code ("rule-operand software code") to be executed to obtain an output thereof which forms an operand 315A of operand type 315Z labeled "Software" within a rule 315 (FIG. 3D) in the rule action pair. Thus, two software codes may be specified, one in the rule ("rule-operand software code") and another in the action ("action software code") of a rule action pair of some embodiments.

A specific software code ("action software code") to be executed by computer(s) 200, to perform the action of a rule action pair, may be selected by a developer to be a programmatic method ("action programmatic method") in an object of an application module, the application module being selected from among a set of application modules deployed in computer(s) 200, as follows. Screen 317 (FIG. 3E) includes a field 318 to receive user input identifying an application module by name. For example, developer 166 may search (by clicking on a search icon located to the right of field 318), to obtain a popup window (not shown) which allows a search for application modules that have been deployed in computer(s) 200. When a specific application module is identified by a developer 166 making a selection in field 318 e.g. by selecting the name of an application module, screen 317 (FIG. 3E) is updated in a column 319A, to show all data access objects that are included in the specific application module identified in field 318. Developer 166 may select one or more objects in column 319A, followed by clicking on button 319M to move the selected objects to another column 319S. For example, in screen 317 of FIG. 3E, an object named "ReqLinesNotificationsVO" is received via column 319S (by setup operation 130) as a selection from among a set of objects in column 319A.

Thereafter, developer 166 clicks on button 319L (FIG. 3E) to load the object(s) identified in column 319S into a subscreen 320 shown at the bottom of screen 317, for use in identifying a specific method therein ("action programmatic method") to be used to access data of a request (e.g. work item). For this reason, the object(s) identified in column 319S are also referred to herein as data access objects. Subscreen 320 (FIG. 3E) shows a software program's identifier which is received via field 320A (by setup operation 130) as a selection from among a set of software programs (e.g. Java classes) in selected object(s) 320D. Thereafter, developer 166 may select a method ("action programmatic method") in field 320B, and the selected method's name forms an identifier of a specific software code to be executed as the action in a rule action pair. In screen 317 of FIG. 3E, an action programmatic method named "initQuery(2)" is received via field 320B (by setup operation 130) as a selection from among a set of action programmatic methods available in the specific software program (e.g. Java class) selected in field 320A.

When selection of a method ("action programmatic method") is received via field 320B, screen 317 of some embodiments is updated to display a table 323 (FIG. 3F) in which are displayed all the outputs of the selected method, e.g. one line per output. Specifically, table 323 includes a first column 323A which displays an internal name of an output attribute of an action programmatic method 320B selected in subscreen 320 (FIG. 3E) and available for inclusion in a region to be displayed to an approver (e.g. which can be rendered on mobile device 170), a second column 323B which identifies for the just-described attribute, a name to be rendered by mobile device 170 in a region to be displayed to the approver (e.g. manager 176), a third column 323C which identifies a sequence number that is used (by runtime operation 140 of framework 100) to output the attributes in a sequence relative to one another, and a fourth column 323D identifying the attribute as being rendered (or not) in the work item 177.

Column 323B is used (by setup operation 130) to receive user input in each line within table 323, in the form of a string of characters typed by developer 166 on a keyboard, the character string identifying the attribute's name to be rendered in the work item. Similarly, column 323D is used (by setup operation 130) to receive user input (e.g. by developer 166 clicking on a mouse) in each line identifying whether or not the attribute is to be rendered (or otherwise used) in the work item. For example, as illustrated in column 323D (FIG. 3F), in a third line of table 323 an attribute with internal name "FundSourceNotKnown" is identified (to setup operation 130) as not to be rendered by the absence of a check mark, while other attributes in table 323 are identified as renderable by the presence of check marks in the respective lines.

At this stage, screen 317 includes a reorder sequence button 319 to be used by developer 166 to change the sequence numbers shown in column 323C. Specifically, in response to button 319 being clicked, a pop-up screen 319S is displayed, listing the output attributes which are to be rendered, and user input is received e.g. from developer 166 selecting an attribute in the listing and moving it from its current position in the sequence, e.g. move attribute named SuggSupplier upwards by clicking on button 319B.

Developer 166 may click on button 320C (FIG. 3G) to obtain a subscreen 321 (shown in FIG. 3H) for use in mapping input parameters of the method ("action programmatic method") selected in field 320B to one or more attributes of the work item 177. Subscreen 321 includes a first column 321A that identifies each input parameter of the method in field 320B, a second column 321B identifies a type of each input parameter, and a third column 321C to receive user input in field 322 selecting an attribute of the work item 177, via a drop down list box that identifies all attributes of the work item. In screen 317 of FIG. 3H, an attribute named "Document Id" is received via field 322 (by setup operation 130) as a selection from among the set of attributes in the drop down list box. The developer's selection is stored in a configuration table in the database, for use in runtime operation. Specifically, the mapping of each attribute in column 321C to a corresponding input parameter in column 321A (FIG. 3H) is used in runtime operation to pass a value of the attribute as the input parameter to the method ("action programmatic method") selected in field 320B (FIG. 3E).

Referring back to FIG. 2, during act 234 (as described above), configuration information is received identifying each line item group (e.g. region identifier) that is includable in work item 177 and a corresponding rule action pair associated therewith (e.g. rule action pair identifier), and this configuration information is stored in tables 236 (FIG. 2) of a relational database (also called "configuration tables"). After act 234 is completed, an act 237 is performed in operation 130, to check whether receipt of rules for each group of line items includable in work item 177 has been completed, and if not return to act 234 (described above). When the answer in act 237 is yes, operation 130 performs an act 238 to check if configuration information is to be received for any more work items, and if so returns to act 231. When no more configuration information is to be received, setup operation terminates.

Runtime operation 140 (FIG. 2) may start at any time after configuration information is received for at least one work item 177 by setup operation 130. Specifically, in an act 241, runtime operation 140 receives a request identifying work item 177 and uses a name of the work item to identify all line item groups that are identified in configuration tables 236 as being includable in the work item 177. Thereafter, runtime operation 140 checks in an act 242 whether any rule, in a rule action pair associated with an includable line item group identified in act 241, is satisfied. If not, runtime operation 140 goes to act 243 to check if all rules (and correspondingly all line item groups includable in the work item 177) have been processed, and if not returns to act 242. When all rules are found to have been processed in act 243, runtime operation 140 returns to act 241 (described above).

In act 242 if the answer is yes, then runtime operation 140 goes to act 244. In act 244, runtime operation 140 executes the specific software code which is identified as an action in the rule action pair wherein the rule is found to be satisfied (in act 242). On execution of the specific software code in act 244, runtime operation 140 obtains one or more name value pairs from pre-existing tables of a relational database 1120. Thereafter, runtime operation 140 performs an act 245 to transmit, as content of the work item 177, the name value pairs which were retrieved in act 244.

In some embodiments, after an app for requests is started, mobile device 170 receives a list of requests (e.g. work items) from one or more computer(s) 200. Mobile device 170 of these embodiments displays the list in act 251 and receives user input on a selected request (e.g. work item), and this user input is transmitted to the one or more computer(s) 200. Thereafter, in act 252, mobile device 170 of such embodiments receives and displays a header of a selected request (e.g. selected work item), followed by act 253 in which mobile device 170 displays a selected line item group within the selected request (e.g. selected work item). After act 253, the mobile device 170 obtains a response (or decision) on the request (e.g. work item), and in an act 254 the response is transmitted as manager 176's user input to the one or more computer(s) 200. Thus, in act 245, runtime operation 140 in the one or more computer(s) 200 receives the user input (e.g. from manager 176 in FIG. 1B) indicative of the response (e.g. approval, disapproval) on the request (e.g. work item) 177. Also in act 245, runtime operation 140 then stores the decision in the relational database 1120 and then returns to act 241 (described above).

Figure 4A:
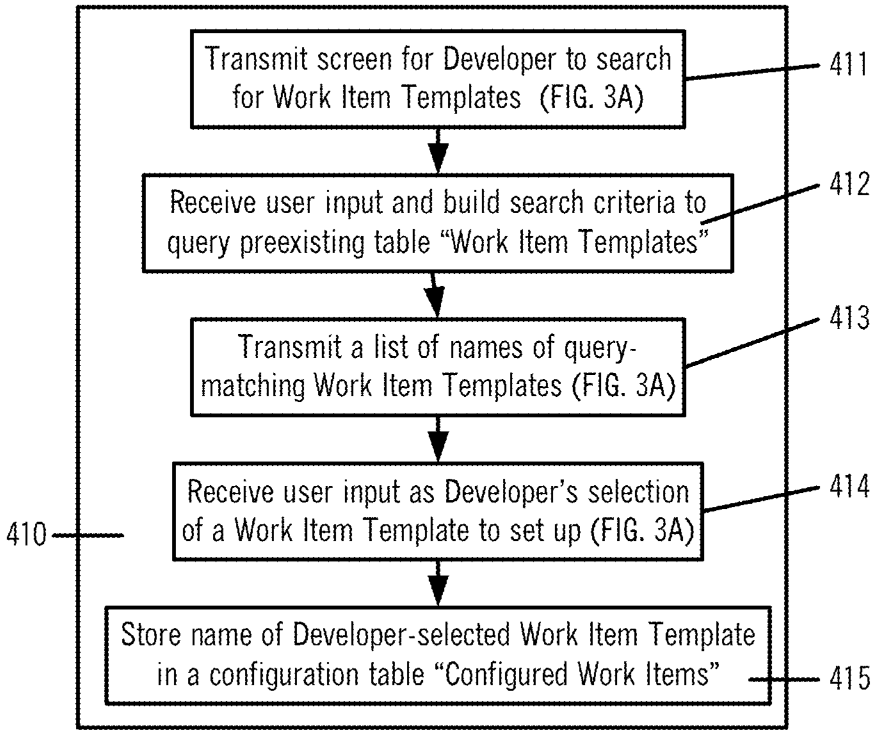
FIG. 4A-4C illustrate, in flow charts, acts performed by one or more computers 200 by use of one or more processors programmed with a sequence of instructions of software stored in one or more memories, to implement setup operation 130 of framework 100 in exemplary embodiments in accordance with the invention.
Figure 4B:
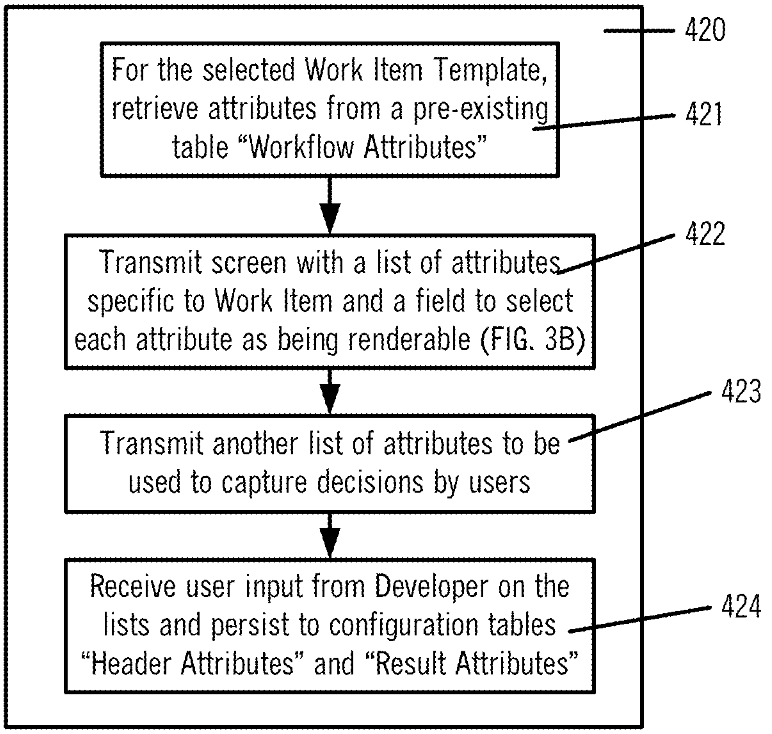
Figure 4C:
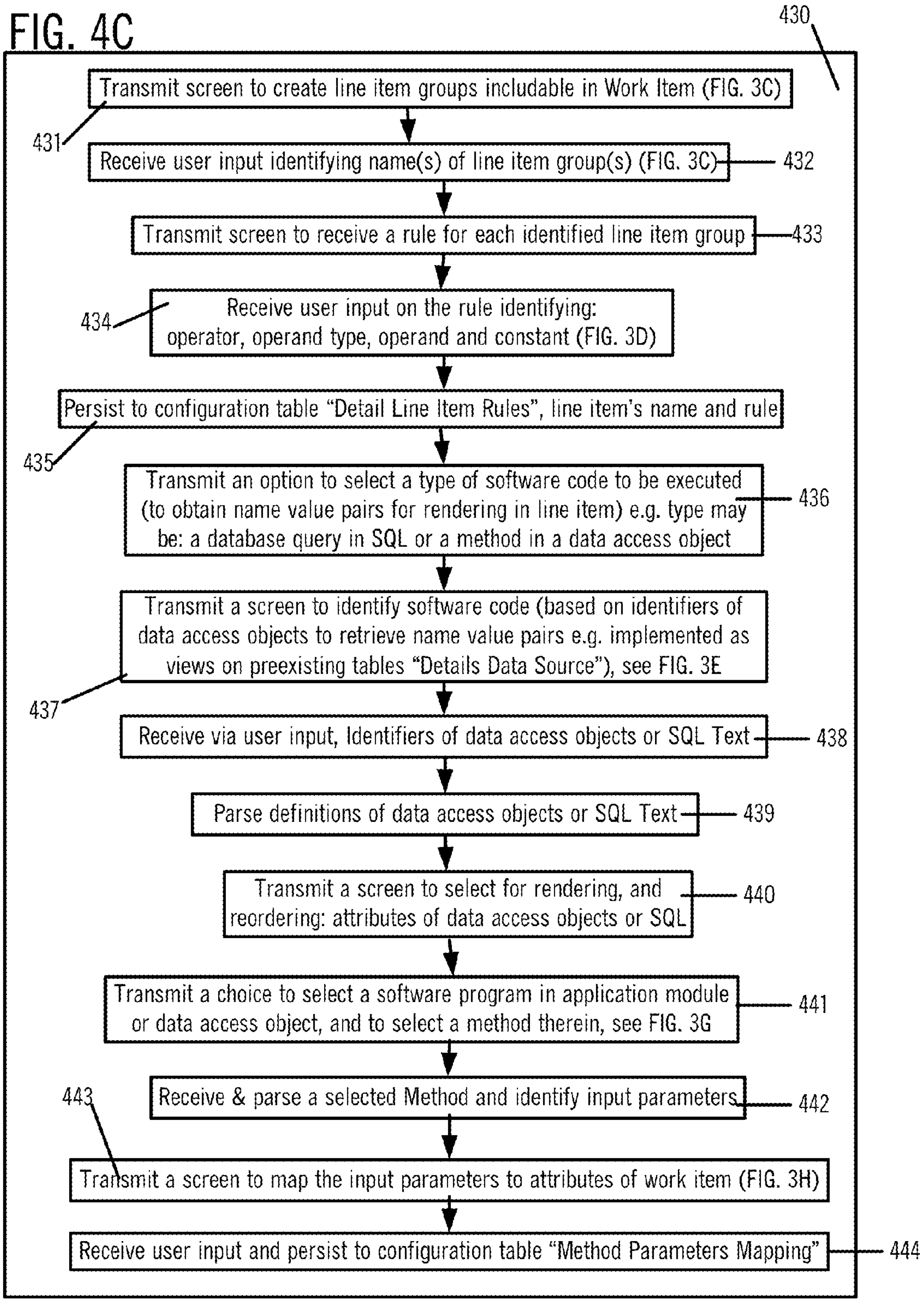

FIG. 4A-4C illustrate, in flow charts, acts performed by one or more computers 200 by use of one or more processors programmed with a sequence of instructions of software stored in one or more memories, to implement setup operation 130 of framework 100, as follows. Specifically, in an act 411 (FIG. 4A), setup operation 130 transmits a screen of the type illustrated in FIG. 3A to client computer 160 to enable developer 166 to search for work item templates that have been previously defined. Subsequently, in act 412, setup operation 130 receives user input and builds search criteria to query a table "Work Item Templates" preexisting in the relational database 1120. Note that certain tables which are described herein as preexisting in relational database 1120 are normally used by one or more business applications installed in operation 210 that implement business logic thereon, to create work items in the normal manner.

Thereafter, in act 413 (FIG. 4A), setup operation 130 transmits to client computer 160 a list of names of query-matching Work Item Templates (as shown in FIG. 3A). Then, in act 414, setup operation 130 receives user input as the developer's selection of a Work Item Template to set up (see FIG. 3A). This is followed by an act 415 wherein setup operation 130 stores the name of the developer-selected work item template in a configuration table named "Configured Work Items" in the relational database 1120. The just-described acts 411-415 are included in a procedure 410 performed by setup operation 130 to identify configured work items.

Subsequently, for the selected work item template subjected to procedure 410, setup operation 130 performs a procedure 420 (FIG. 4B) to configure a header to be rendered in a work item as follows. In act 421, setup operation 130 retrieves attributes from a table named "Workflow Attributes" that is pre-existing in the relational database 1120. Thereafter, in an act 422, setup operation 130 transmits to client computer 160 a screen (see FIG. 3B) with a list of attributes specific to the work item and a field to select each attribute as being renderable. Then, in an act 423, setup operation 130 transmits to client computer 160 another list of attributes for use in configuring how runtime operation 140 captures decisions by users, such as "approval" or "disapproval". Next, in act 424, setup operation 130 receives user input from developer's client computer 160 on the just-described two lists and persist them to the respective configuration tables "Header Attributes" and "Result Attributes".

In some embodiments, setup operation 130 performs a procedure 430 (FIG. 4C) as follows. In act 431, setup operation 130 transmits a screen to create line item groups includable in Work Item (FIG. 3C). In act 432, setup operation 130 receives user input identifying name(s) of line item group(s). In act 433, setup operation 130 transmits a screen to receive a rule for each identified line item group. In act 434, setup operation 130 receives user input on the rule identifying operator, operand type, operand and constant (FIG. 3D). In act 435, setup operation 130 persists to configuration table "Rules and Software Codes", line item's name and rule. In act 436, setup operation 130 transmits an option to select a type of a specific software code to be executed, to obtain multiple name value pairs for rendering in line item, e.g. type may be: a database query in SQL or a method in a data access object ("action programmatic method").

Figure 3H:
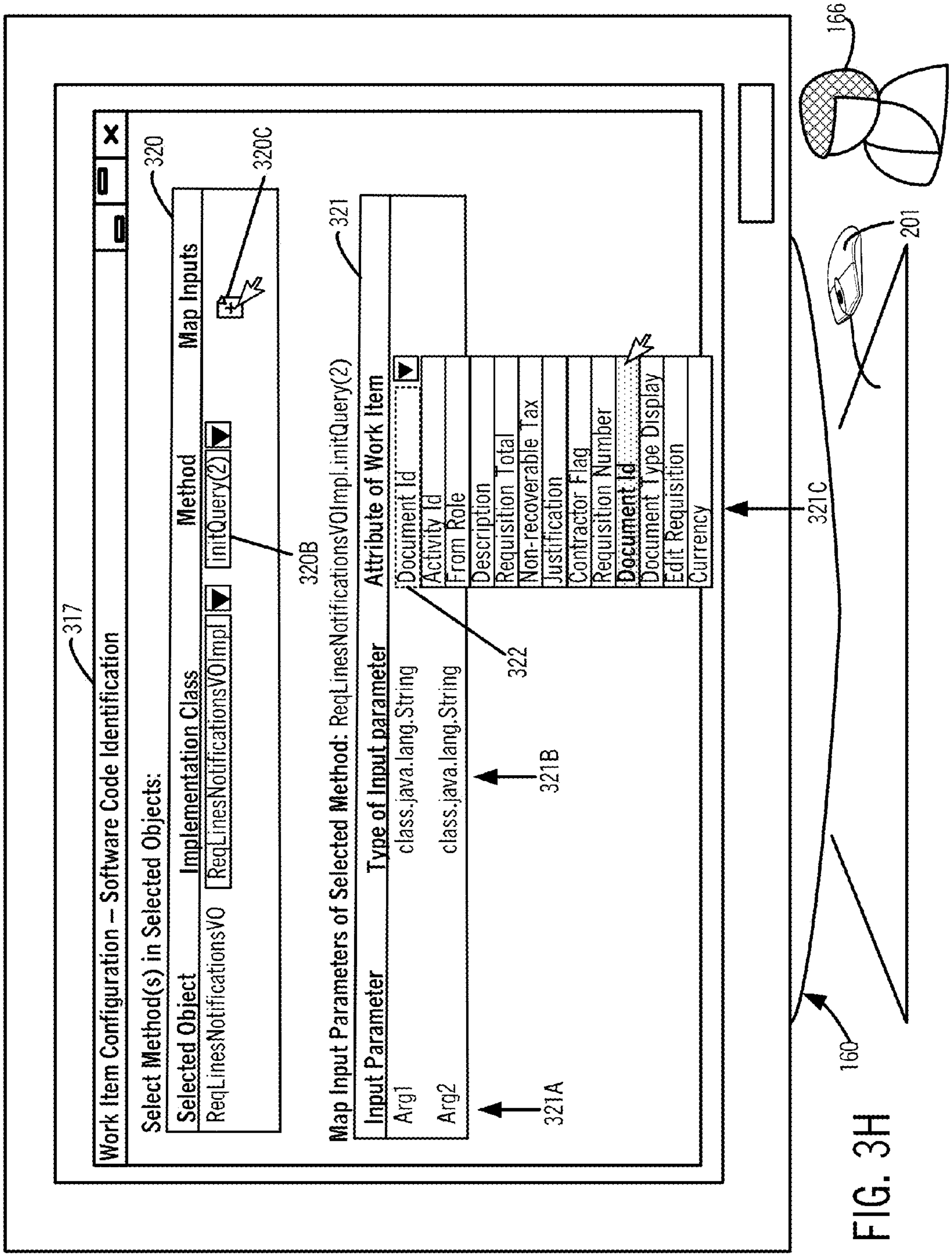

In act 437, setup operation 130 transmits a screen to identify a specific software code based on identifiers (also called "software code identifiers") of data access objects in the Rules & software codes table, which are executed to retrieve multiple name value pairs, e.g. implemented as views on preexisting tables "Details Data Source". In act 438, setup operation 130 receives via user input, Identifiers of data access objects or SQL Text. In act 439, setup operation 130 parses definitions of data access objects or SQL Text. In act 440, setup operation 130 transmits a screen to select for rendering, and reordering: attributes of data access objects or SQL. In act 441, setup operation 130 transmits a choice to select a software program from among a set of software programs in the application module or in a data access object, and to select a method in the selected software program ("action programmatic method"). In act 442, setup operation 130 receives & parses a selected method ("action programmatic method") and identifies input parameters. In act 443, setup operation 130 transmits a screen to map the input parameters to attributes of work item (FIG. 3H). In act 444, setup operation 130 receives user input identifying a correspondence between each input parameter and a work item attribute, and stores this information to configuration table "Method Parameters Mapping".

Figure 5A:
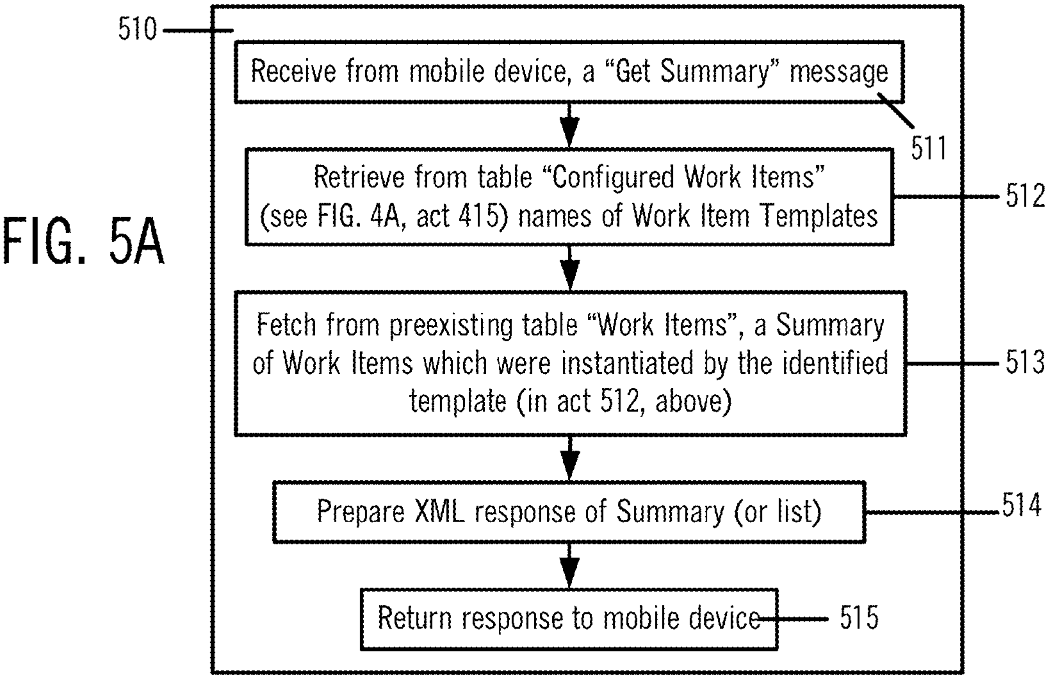
FIG. 5A-5D illustrate, in flow charts, acts performed by one or more computers 200 by use of one or more processors programmed with a sequence of instructions of software stored in one or more memories, to implement runtime operation 140 of framework 100 in exemplary embodiments in accordance with the invention.

FIG. 5A-5D illustrate, in flow charts, acts performed by one or more computers 200 by use of one or more processors programmed with a sequence of instructions of software stored in one or more memories, to implement runtime operation 140 of framework 100 in exemplary embodiments as follows. In act 511, runtime operation 140 receives from mobile device 170 of manager 176 a "Get Summary" message. In act 512, runtime operation 140 retrieves from the table "Configured Work Items" (see FIG. 4A, act 415) the names of work item templates. In act 513, runtime operation 140 fetches from preexisting table "Work Items", a Summary (or list) of Work Items which were instantiated by use of the template named in act 512 (above). In act 514, runtime operation 140 prepares an XML response of Summary. In act 515, runtime operation 140 returns a response to mobile device 170. Acts 511-515 are performed in a procedure 510 (FIG. 5A).

In act 521 (FIG. 5B), runtime operation 140 receives from manager 176, a "Get Details" message. In act 522, runtime operation 140 gets from the message, an Identifier of Work Item. In act 523, runtime operation 140 retrieves from table "Configured Work Items", the following: Workflow Name (or request type) and Work Item Template Name for the work item ID (or request ID). In act 524 (FIG. 5B), runtime operation 140 uses the Workflow Name and Work Item Template Name to retrieve metadata from the following configuration tables: (a) Header Attributes, (b) Result Attributes, (c) Line Items (d) Rules & software codes (e) Line item attributes and (f) Method Parameters Mapping. In act 525, runtime operation 140 evaluates the rules & executes the specific software codes to obtain line items, with each line item including one or more name value pairs (also called "details"). Specifically, in act 525, multiple name value pairs are retrieved by executing data access objects, e.g. implemented as views on preexisting tables named "Details Data Source". In act 526, runtime operation 140 uses metadata to transform the multiple name value pairs into content of the work item (e.g. by arranging them in a specific sequence of multiple lines relative to one another, as specified in column 323C of FIG. 3F). In act 527, runtime operation 140 prepares XML with header attributes, result attributes, and details.

Figure 5B:
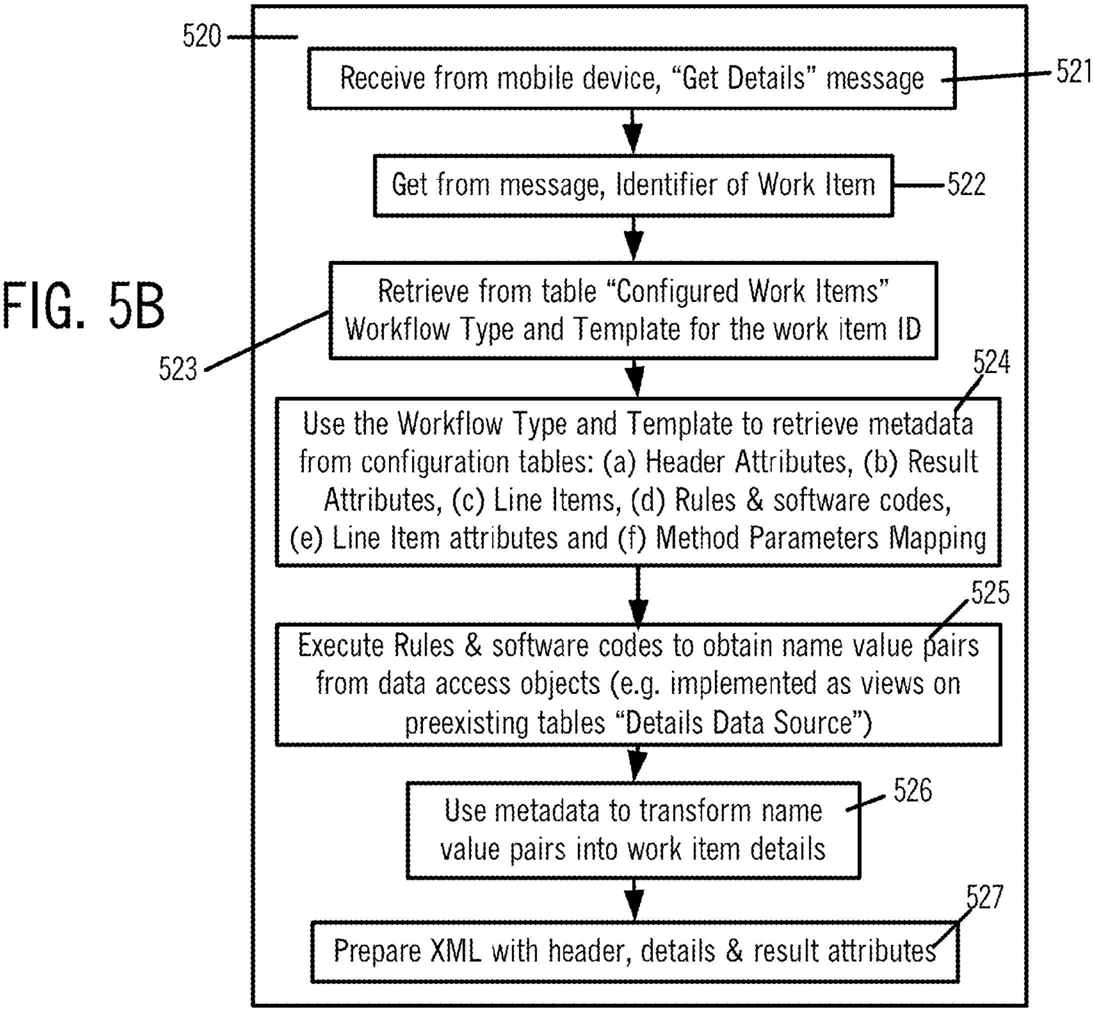
Figure 5C:
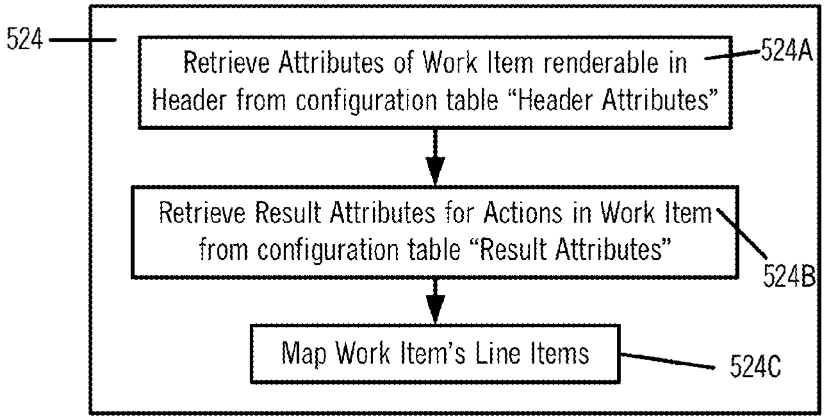
Figure 5D:
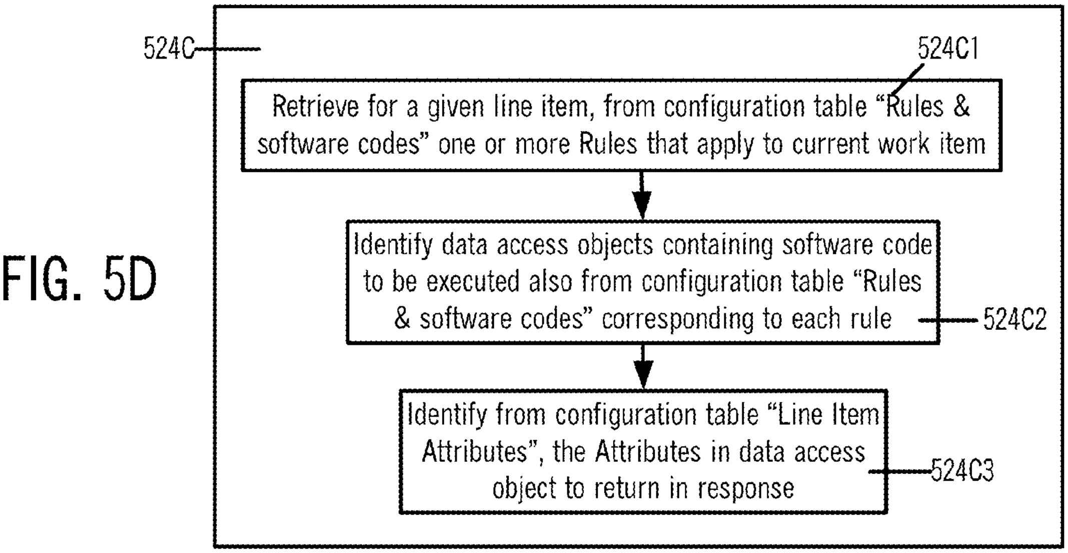

Note that act 524 of some embodiments may be implemented as illustrated in FIG. 5C by performance of acts 524A-524C as follows. In act 524A, runtime operation 140 retrieves attributes of the Work Item which are renderable in the header from a configuration table "Header Attributes". Thereafter, in act 524B, runtime operation 140 retrieves the Result Attributes for Actions in Work Item from configuration table "Result Attributes". Subsequently, in act 524C, runtime operation 140 maps the work item's line items, e.g. by performing the acts 524C1-524C3 illustrated in FIG. 5D as follows. In act 524C1, runtime operation 140 retrieves from configuration table "Rules & software codes" one or more Rules that apply to corresponding line item groups that are includable in the current work item. Then, in act 524C2, runtime operation 140 identifies data access objects containing the specific software code to be executed, also from configuration table "Rules & software codes" corresponding to each applicable rule identified in act 524C1. Finally, in act 524C3, runtime operation 140 identifies from configuration table "Line Item Attributes", the attributes in data access object to be returned in response.

FIGS. 6A and 6B illustrate a work item's header 173 (see FIG. 1D) and a corresponding group 174 (see FIG. 1E) of line items generated by runtime operation 140 of framework 100 by performance of act 527 in FIG. 5B, when a rule is satisfied, for the first line item group 310A named "Requisition_Lines_Yes" in FIG. 3C. FIGS. 6C and 6D illustrate a work item's header 173 (see FIG. 1D) and a corresponding group 174 (see FIG. 1E) of line items generated by runtime operation 140 of framework 100 by performance of act 527 in FIG. 5B, when a different rule is satisfied, for the second line item group 310B named "Requisition_Lines_No" in FIG. 3C. Comparison of FIGS. 6B and 6D shows that the name value pairs that are displayed are different, based on corresponding different rules being satisfied, which result in different regions being rendered (e.g. region id=1022 as identified in the "body" portion of FIG. 6A is rendered in FIG. 6B, whereas region id=1023 as identified in the "body" portion of FIG. 6C is rendered in FIG. 6D).

The above-described associations between rules and corresponding identifiers (also called "software code identifiers") of specific software codes (which form rule action pairs as noted above), as well as all the rules themselves are stored in one or more configuration tables 236 (FIG. 2) by one or more processors 1105 that are included in certain embodiments of the one or more computers 200 of the type described above. In several such embodiments, configuration tables 236 and/or preexisting tables 249 (which hold information related to work items) are stored in relational database 1120 (FIG. 1C) that is accessed via commands in a Structured Query Language (SQL) to a relational database management system (RDBMS) 1130. A specific RDBMS 1130 which is executed by one or more processors 1105 depends on the embodiment, although some embodiments use RDBMS software called "ORACLE Database 12*c*" available from Oracle Corporation of Redwood Shores, Calif., USA. Such database(s) 1120 may additionally be used to store work items, and/or multiple name value pairs included as content of line items, depending on the embodiment.

Figure 7B:
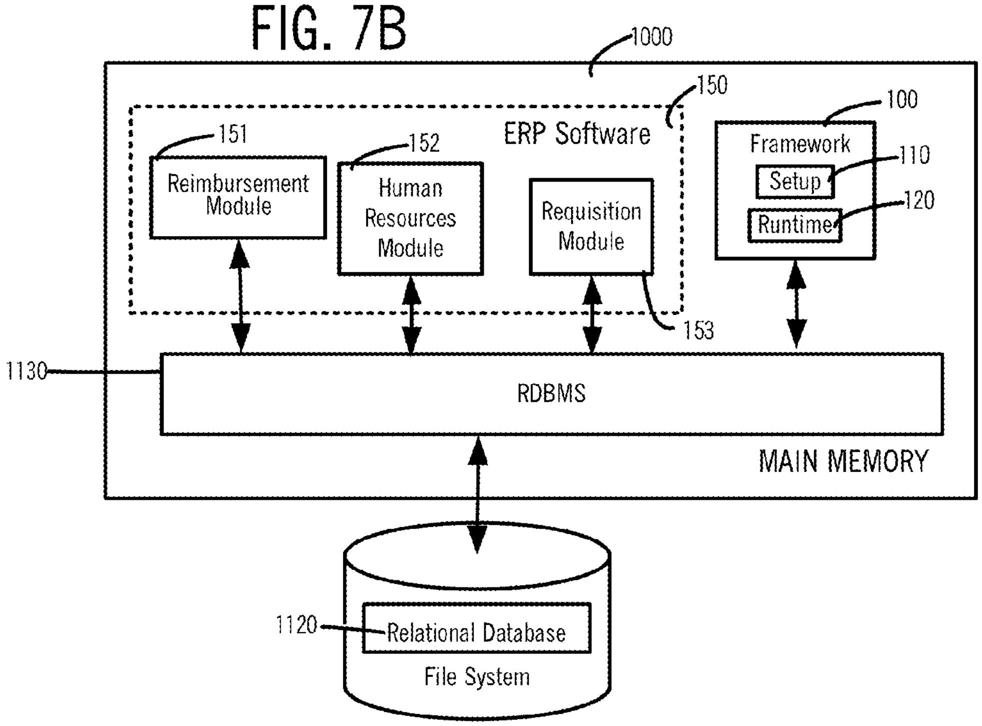

Computer(s) 1000 illustrated in FIGS. 7A and 7B may be used to implement server computer(s) 200 described above, and/or client computers 182, 186, 160 and/or mobile devices 170, 167 and 189. Specifically, computer(s) 1000 of some embodiments include a bus 1102 (FIG. 7A) or other communication mechanism for communicating information, and one or more processor(s) 1105 coupled with bus 1102 for processing information. Computer(s) 1000 use (as the above-described memory) a main memory 1106, such as a random access memory (RAM) or other dynamic storage device, coupled to bus 1102 for storing information and instructions (e.g. to perform act(s) of FIGS. 1A-1B, FIG. 2, FIGS. 4A-4C and 5A-5D) to be executed by processor(s) 1105 (FIG. 1C). Main memory 1106 (FIG. 7A) also may be used for storing temporary variables or other intermediate information during execution of instructions (e.g. in modules 461-466) by processor 1105. Computer(s) 1000 further include a read only memory (ROM) 1104 or other static storage device coupled to bus 1102 for storing static information and instructions for processor 1105, such as software in the form of a browser. A storage device 1110, such as a magnetic disk or optical disk, is provided and coupled to bus 1102 for storing information and instructions.

Computer(s) 1000 (FIG. 7A) may be coupled via bus 1102 to a display device or video monitor 1112 such as a cathode ray tube (CRT) or a liquid crystal display (LCD), for displaying information (e.g. via a browser) to a computer user (e.g. user 411, 441 or 451) on the display 1112. An input device 1114, including alphanumeric and other keys (e.g. of a keyboard), is coupled to bus 1102 for communicating information (such as user input, e.g. from any user 181, 185, 166, or 170) to processor 1105. Another type of user input device is cursor control 1116, such as a mouse 201 (FIG. 3A), a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane. In addition to display device 1112, computer(s) 1000 may include a speaker (not shown) as another output device for use by processor 1105 in interacting with any of user(s) 181, 185, 166, or 176.

As described elsewhere herein, execution of ERP software 150 (FIG. 1C) in computer(s) 1000 (FIG. 7A) may be implemented by one or more processor(s) 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 to perform setup operation 130 as illustrated in FIG. 1C and/or to perform runtime operation 140 also illustrated in FIG. 1C. In alternative embodiments, hard-wired circuitry may be used in place of or in combination with software instructions in modules 110 and 120 located in memory 1000 as illustrated in FIG. 7B, to perform the corresponding operations 130 and 140 of FIG. 1C. Also, although framework 100 is included in ERP software 150 as illustrated in FIG. 1C in some embodiments, framework 100 may be implemented outside ERP software 150 as illustrated in FIG. 7B.

The term "non-transitory computer-readable storage medium" as used herein refers to any non-transitory storage medium that participates in providing instructions to processor 1105 (FIG. 7A) for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computer(s) 1000. Volatile storage media includes dynamic memory, such as main memory 1106 which may be implemented in the form of a random access memory or RAM.

Instructions to processor 1105 (FIG. 7A) can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer(s) 1000 (FIG. 7A) can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory

1106 may optionally be stored on storage device 1110 either before or after execution by processor 1105.

Computer(s) 1000 (FIG. 7A) also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 (FIG. 7A) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer(s) 1000, are exemplary forms of carrier waves transporting the information.

Computer(s) 1000 (FIG. 7A) can send messages and receive data, including program code, through the network(s), network link 1120 and communication interface 1115. In the Internet example, a server 1100 might transmit information retrieved from RDBMS database through Internet 1124, ISP 1126, local network 1122 and communication interface 1115. The sequences of instructions for performing the operations 130, 140 of FIG. 1C and/or one or more acts illustrated in FIGS. 1A-1B, 2, 4A-4C and 5A-5D may be executed by processor 1105 as these instructions are received, and/or stored in storage device 1110, or other non-volatile storage for later execution. In this manner, computer(s) 1000 may additionally or alternatively obtain instruction sequences and any related data in the form of a carrier wave.

FIG. 7A is a very low-level representation of many hardware components of one or more of computer(s) 1000, which may be used to implement computer(s) 200 to perform acts described above in reference to FIGS. 1A-1B, 2, 4A-4C and 5A-5D. Several embodiments have one or more additional software components in main memory 1106 as shown in FIG. 7B. In addition to main memory 1106, computer(s) 1000 may include one or more other types of memory such as flash memory (or SD card) and/or a hard disk and/or an optical disk (also called "secondary memory") to store data and/or software for loading into memory 1106 (also called "main memory") and/or for use by processor(s) 1105. In some embodiments, computer(s) 1000 of FIG. 7A implements a relational database management system 1130 to manage data in one or more tables 236, 249 of a relational database 1120 of the type illustrated in FIG. 7B. Such a relational database management system 1130 may manage a distributed database system that includes multiple databases, each table being stored on different storage mechanisms.

In some embodiments, the multiple databases are made to appear as a single database. In such embodiments, processor 1105 can access and modify the data in a relational database 1120 via RDBMS 1130 that accepts queries from various software codes e.g. action programmatic method 320B (FIG. 3E) in conformance with a relational database language, the most common of which is the Structured Query Language (SQL). The commands are used by processor 1105 of some embodiments to store, modify and retrieve configuration information and/or content of line items as rows of data ("database rows") from tables in relational database 1120.

Relational database management system 1130 further includes output logic that makes the data in a database table available to a user via a graphical user interface that generates a screen on a video monitor display 1112. In one example, the output logic of computer(s) 1000 provides results via a web-based user interface that depicts in a browser, information related to work items as illustrated in any one or more of FIGS. 3A-3G. Additionally and/or alternatively, screens responsive to a command in a command-line interface and display on a video monitor may be generated by computer(s) 1000.

In some embodiments of computer(s) 1000, functionality in the above-described operations or acts of FIGS. 1A-1B, 2, 4A-4C and 5A-5D is implemented by processor 1105 executing software in memory 1106 of computer(s) 1000, although in other embodiments such functionality is implemented in any combination of hardware circuitry and/or firmware and/or software in computer(s) 1000. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 1A-1B, 2, 4A-4C and 5A-5D can, but need not necessarily include, one or more microprocessors, embedded processors, controllers, application specific integrated circuits (ASICs), digital signal processors (DSPs), multicore processors and the like.

Any non-transitory computer-readable medium tangibly embodying software (also called "computer instructions") may be used in implementing one or more acts or operations described herein and illustrated in FIGS. 1A-1B, 2, 4A-4C and 5A-5D. Such software may include program codes stored in memory 1106 and executed by processor 1105. Memory 1106 may be implemented within or external to processor 1105, depending on the embodiment. When implemented in firmware and/or software, logic to perform one or more acts or operations of FIGS. 1A-1B, 2, 4A-4C and 5A-5D may be stored as one or more computer instructions or code on a non-transitory computer-readable medium.

In some embodiments, one or more of computer(s) 1000 may include multiple processors, each of which is programmed with software in a memory 1106 shared with each other to perform operations 130, 140 of the type described above as illustrated in FIG. 1C. For example, a first processor 1105 in computer(s) 1000 may be programmed with software in memory 1106 to implement a setup module 110, to perform setup operation 130. A second processor 1105 in computer(s) 1000 may be programmed with software in memory 1106 to implement a runtime module 120, to perform runtime operation 140. Although two processors 1105 have been just described for some embodiments to implement the respective means, in other embodiments a single processor 1105 may be used in a time shared manner to implement the just-described modules. Furthermore, in still other embodiments, one processor 1105 may be used in a time-shared manner to implement one or more parts of various modules. Furthermore, although processors 1105 have been described above for certain embodiments as being included in a single computer(s) 1000, in other embodiments multiple such processors 1105 may be included in multiple computers 1000, for example two computers 1000 may implement the two modules 110 and 120 to perform the two operations 130, 140 described above. Additionally, in one or more such embodiments, one or more processor(s) 1105 with a bus 1103 execute ERP software 150 in computer(s) 1000.

FIGS. 8A-8J illustrate displays that are rendered by mobile device 170 of some embodiments, in response to performance by computer(s) 1000 of operations 130, 140 of the type described above as illustrated in FIGS. 1A-1C, 2, 4A-4C and 5A-5D. Mobile device 170 includes a request application which is generic to multiple request types, and understands requests represented using a canonical XML structure, as illustrated by requests shown in FIGS. 6A to 6D. Some embodiments of request application in mobile device 170 does not contain any logic or data specific to a particular request type. In such embodiments, no changes are required to the request application in mobile device 170, to display requests of any new type configured by setup operation 130, followed by use thereof during execution of runtime operation 140 that produces the requests in the form of canonical XML documents in framework 100. Illustrative examples of request types are Expense Reports, Purchase Requisitions, Purchase Orders, Invoices, and Timecards. Any new request type can be added to framework 100, using setup operation 130 (e.g. as shown in FIGS. 3A to 3H), followed by generation of requests of the new request type by runtime operation 140, followed by display of the new type of requests by the request app in mobile device 170.

Figure 8A:
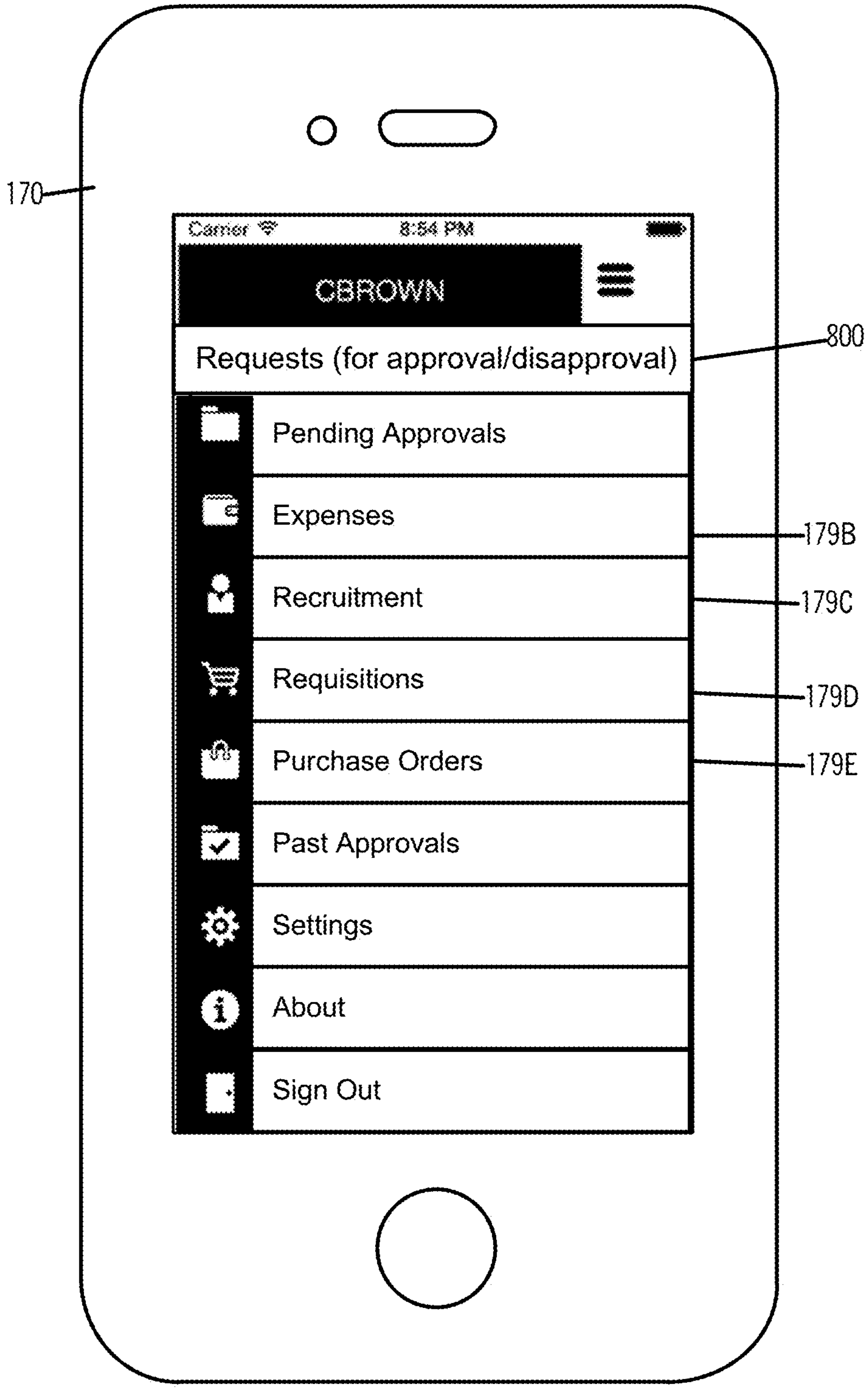
FIGS. 8A-8J illustrate displays that are rendered by mobile device 170 of some embodiments.

Specifically, FIG. 8A illustrates an initial display of the request application ("app") 800 on execution thereof in mobile device 170, including buttons that identify individual request types, e.g. an expenses button 179B, a recruitment button 179C, a requisitions button 179D, a purchase orders button 179E. The request app may include buttons unrelated to request types, such as a pending approvals button, a past approvals button, a settings button, an about button, and a signout button.

Figure 8B:
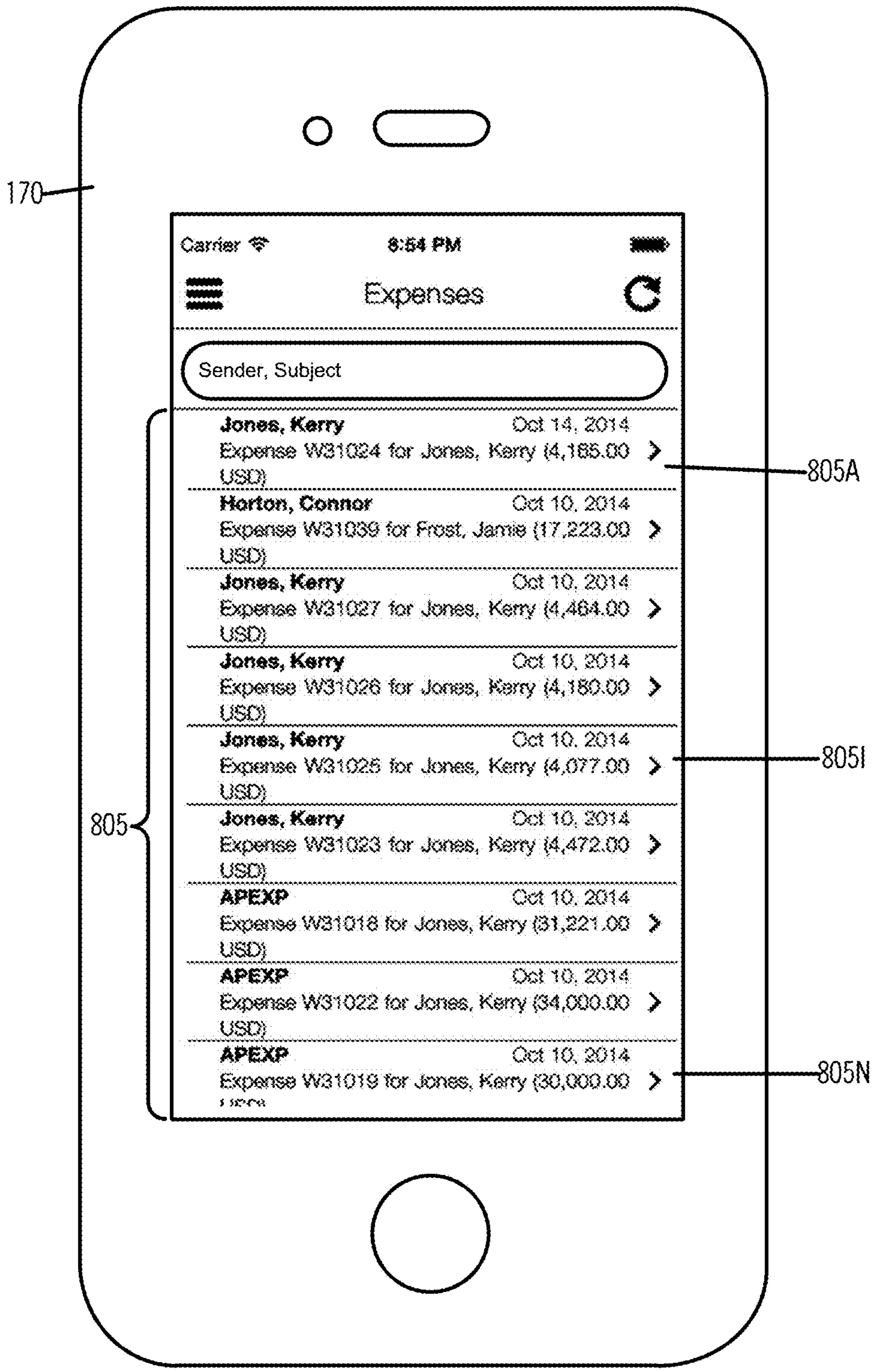

In response to a human (e.g. approver) touching expenses button 179B, mobile device 170 transmits to server computer(s) 200 described above a message containing the request type of "expense." This message is used by server computer(s) 200 in performing act 143 to prepare and transmit to mobile device 170 for display therein a summary 805 (similar to list 171 shown in FIG. 1C), identifying requests 805A . . . 8051, 805J . . . 805N (as shown in FIG. 8B), as being available for display. In response to the human (e.g. approver) touching a specific request in summary 805, mobile device 170 transmits to server computer(s) 200 a message that identifies the specific request 805J (e.g. similar to request ID 172 shown in FIG. 1C). In response, computer(s) 200 evaluate one or more rules to identify, one or more region(s) renderable in the specific request, followed by execution of specific software code(s) thereof, followed by preparation and transmission of one or more messages containing the specific request to mobile device 170 (e.g. similar to request 177 shown in FIG. 1C).

Figure 8C:
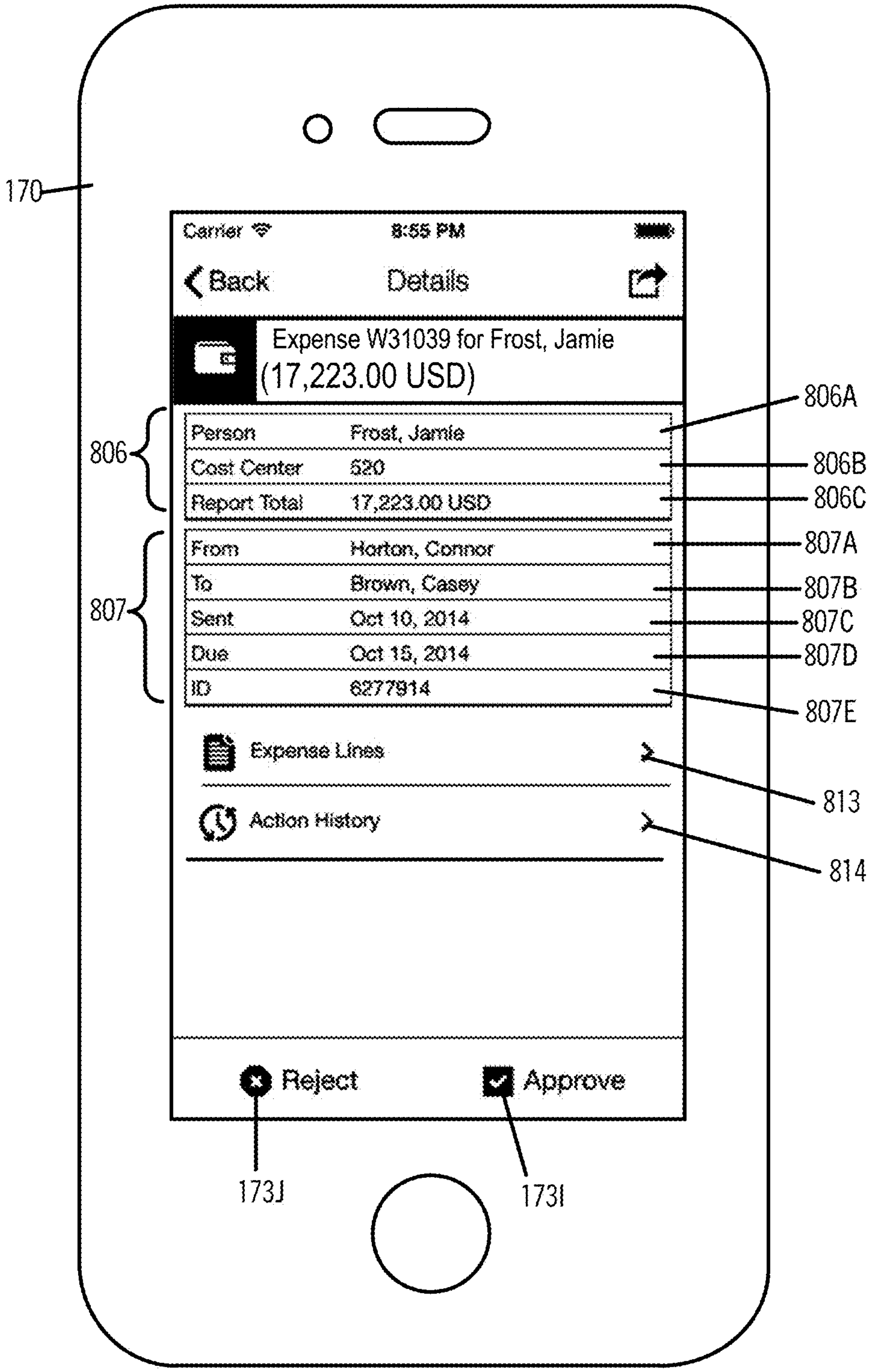
Figure 8D:
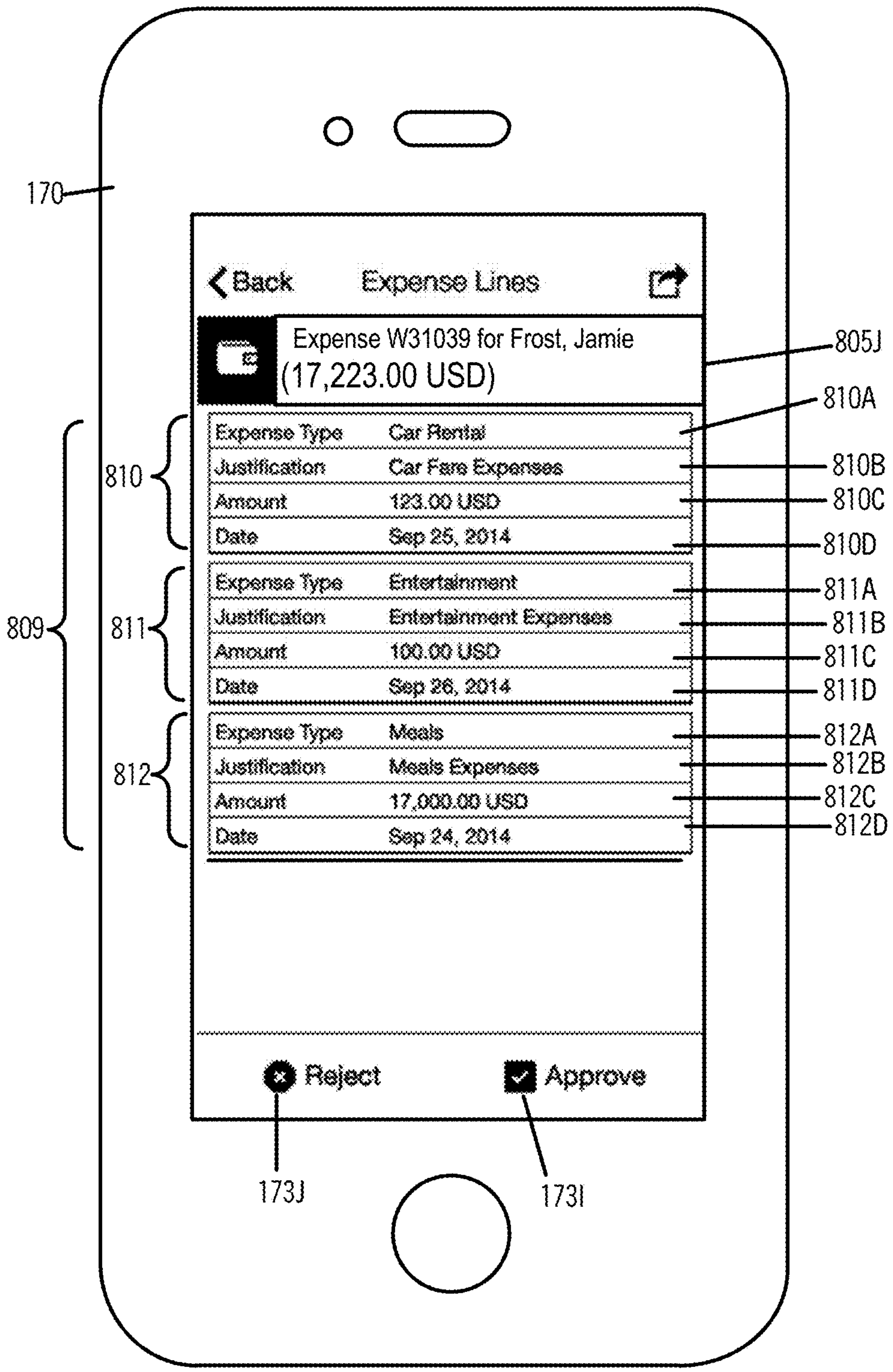

The message(s) of a specific request may include one or more header(s) e.g. as regions 806 and 807 (FIG. 8C) and one or more links to corresponding regions (or line item groups), such as a link 813 (FIG. 8C) named "Expense Lines" and another link 814 (FIG. 8C) named "Action History". Note that the name "Expense Lines" and the link 813 are an example of a name value pair in the header. Such message(s) may further include content to be displayed on operation of each link in the header, e.g. as a region 809 including display rows 810-812 (FIG. 8D) which is displayed on operation of the link 813 (FIG. 8C). As shown in FIG. 8D, a single display row 810 includes four lines 810A-810D, wherein each line includes a name and a value, e.g. line 810C includes the name "Amount" and the value "123.00 USD". Similarly, display rows 811 and 812 shown in FIG. 8D include lines 811A-811D and lines 812A-812D respectively. As will be readily apparent in view of this description, header and content of a request may be transmitted from the one or more computer(s) 200 to mobile device 170, either together in a single message, or separately in two or more messages.

Figure 8E:
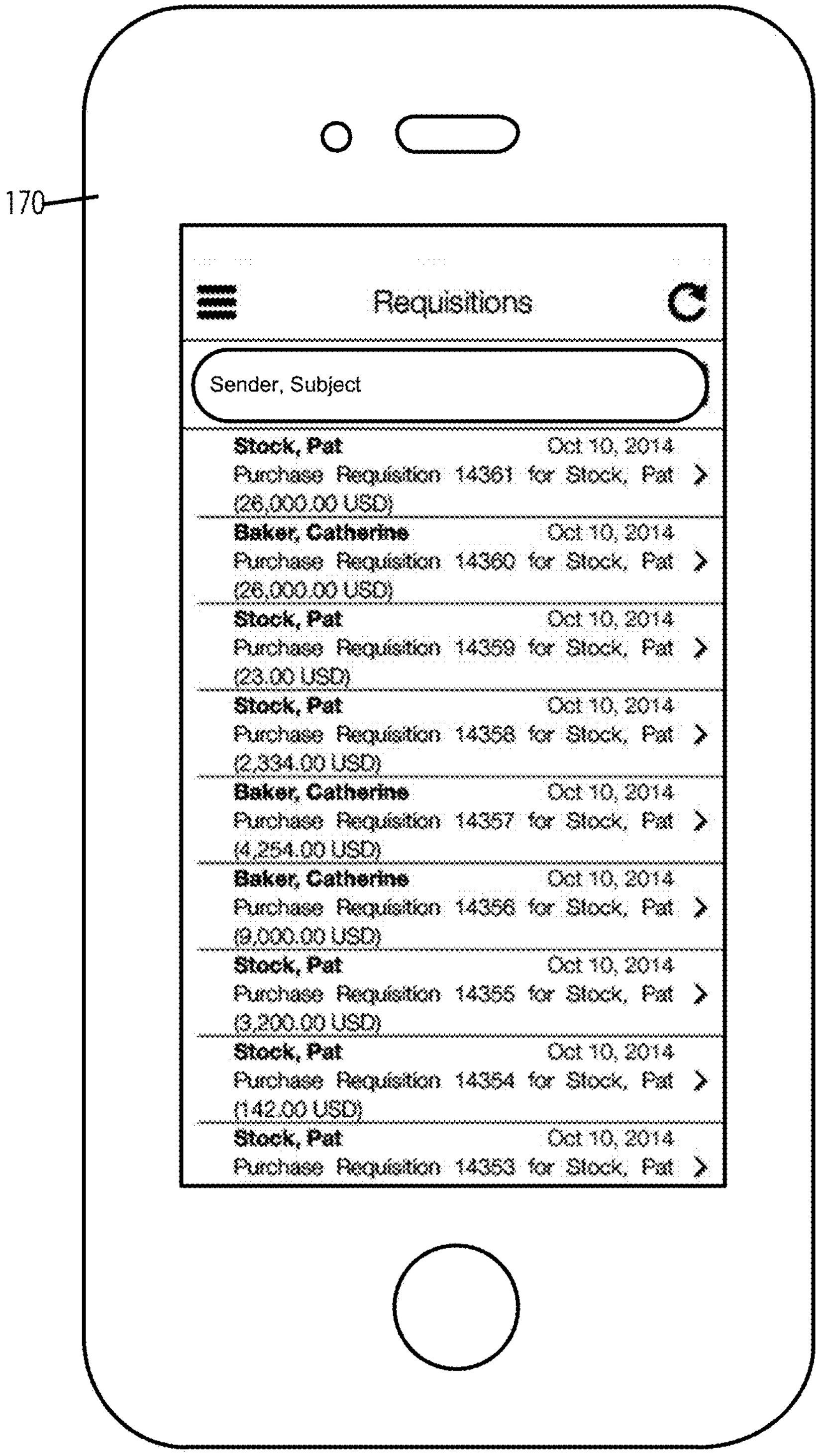
Figure 8F:
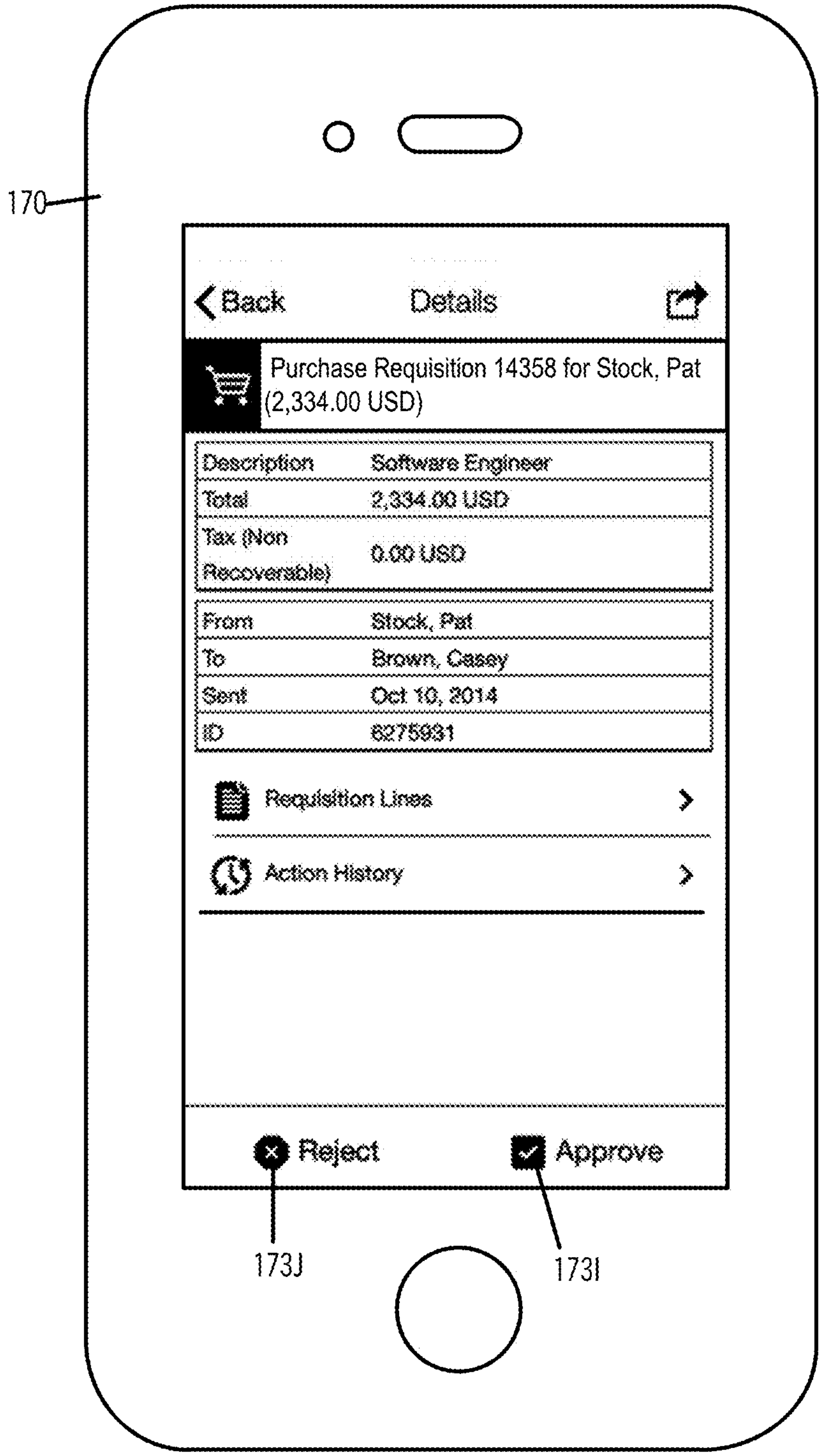
Figure 8G:
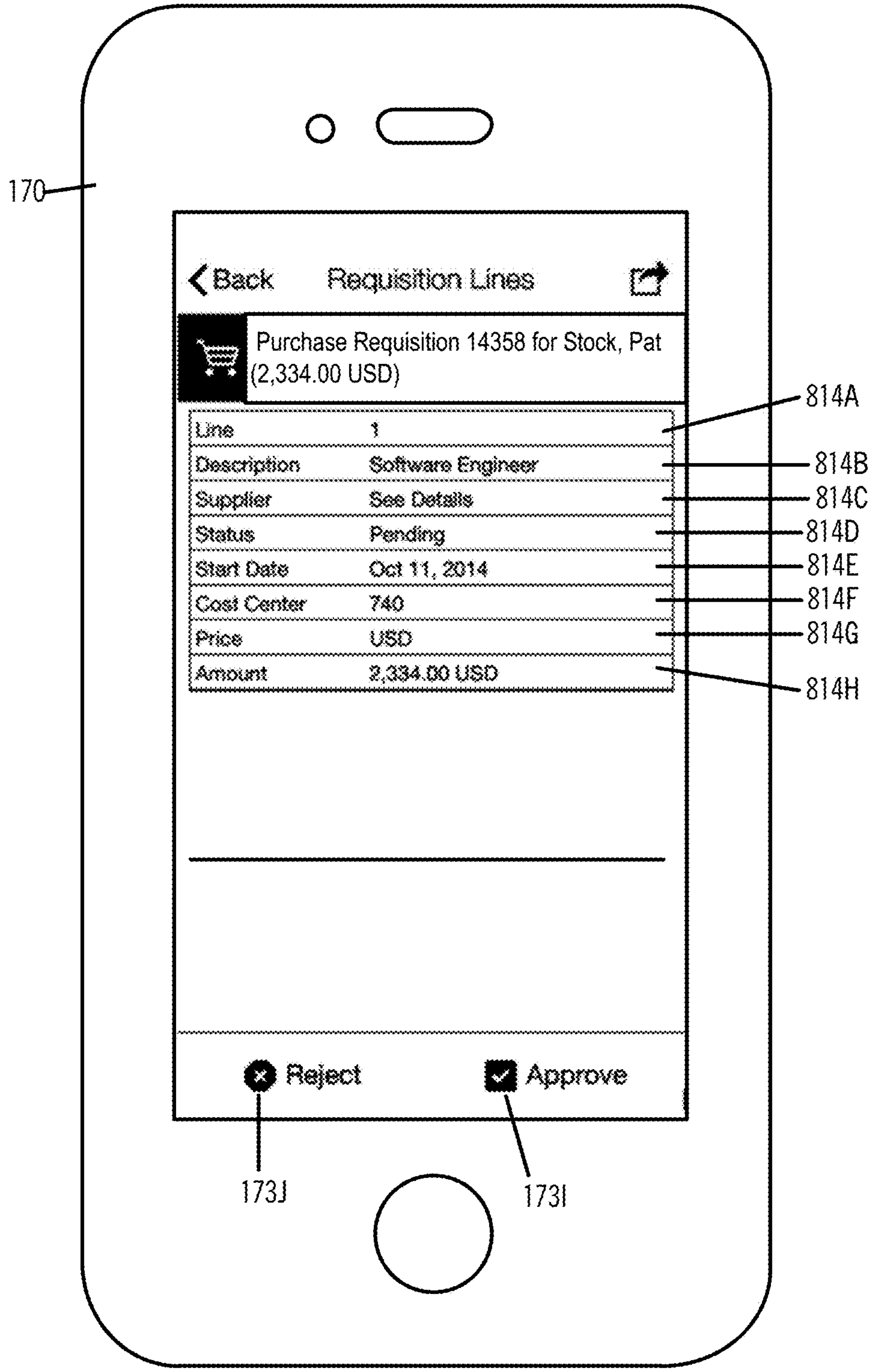
Figure 8H:
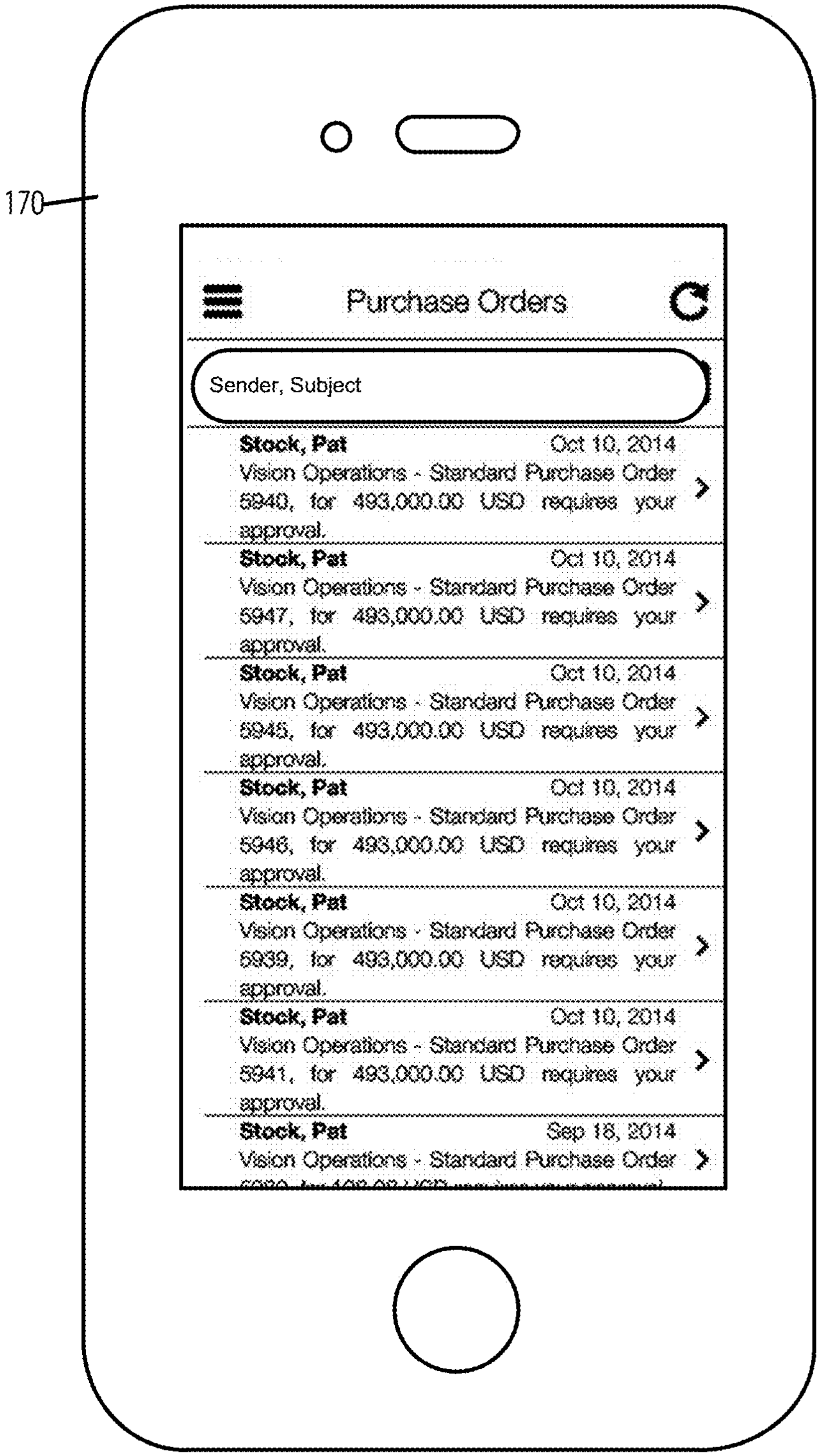
Figure 8I:
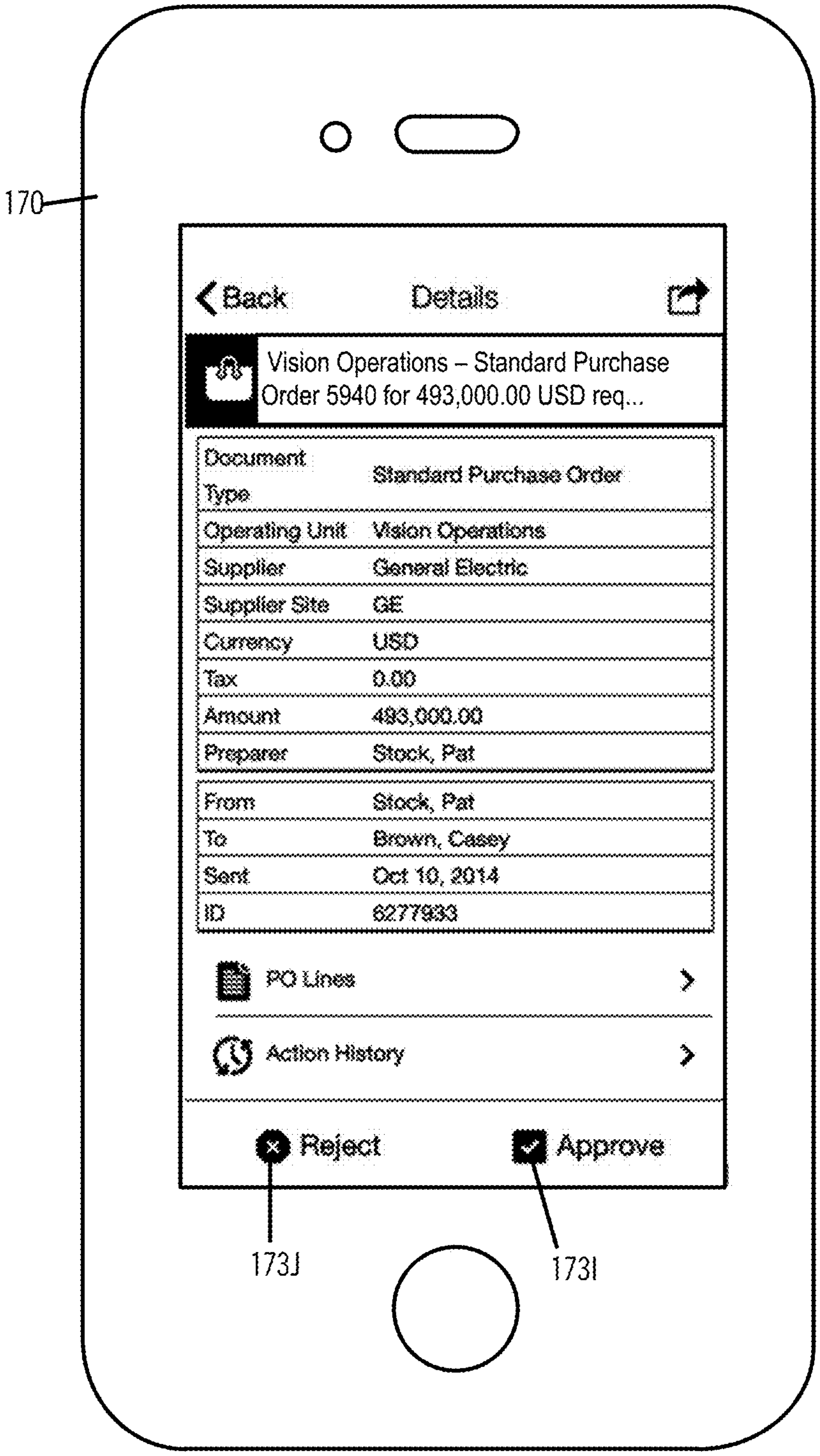
Figure 8J:
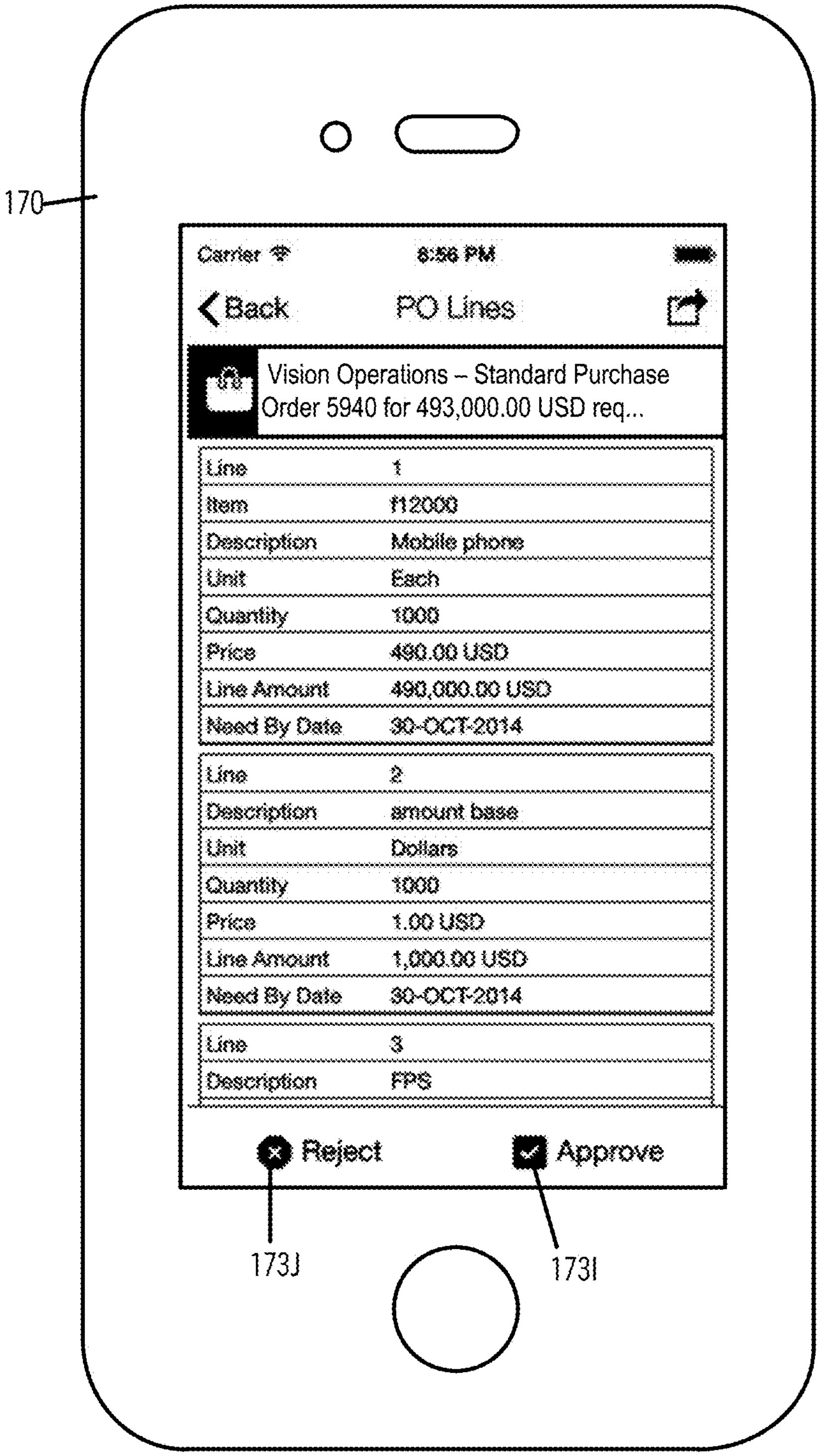

Similarly, in response to the human (e.g. approver) touching Requisitions button 179C or Purchase Orders button 179D mobile device 170 interacts with server computer(s) 200 to display summaries (or lists) of available requests, as shown in FIG. 8E or 8H respectively. Also similarly in response to the human touching a specific request in the available-request summaries shown in FIG. 8E or 8H, mobile device 170 interacts with server computer(s) 200 to display the header and content of the specific request identified in the respective available-request summary, e.g. as shown in FIGS. 8F and 8G, or as shown in FIGS. 81 and 8J respectively. Accordingly, a request app of the type described above standardizes the user interface and document exchange between in mobile device 170 and server computer(s) 200.

Various adaptations and modifications may be made without departing from the scope of the described embodiments. Numerous modifications and adaptations of the embodiments described herein are encompassed by the attached claims.

The invention claimed is:

1. A computer-implemented method of generating requests to be displayed, the computer-implemented method comprising:

in a setup operation, preparing and transmitting one or more first screens to receive, from one or more first computers, a set of identifiers of one or more regions that are includable in a request for user input indicative of at least one of approval or disapproval;

in the setup operation, for each includable region identified in the set, receiving, from the one or more first computers, a rule action pair corresponding to said each includable region, wherein the rule action pair comprises a rule and an identifier of a specific software code to be executed to render said each includable region when the rule is satisfied;

in a runtime operation, responding to receipt from a mobile device of a message that identifies the request, by evaluating in one or more second computers at least one rule in the rule action pair corresponding to at least one includable region identified in the set received for the request, to identify one or more regions to be rendered in displaying the request;

in the runtime operation, for at least one to-be-rendered region identified by the evaluating, executing in the one or more second computers, at least the specific software code identified in the rule action pair corresponding to said at least one to-be-rendered region, to obtain from a relational database a plurality of first rows, each first row comprising a plurality of name value pairs; and in the runtime operation, preparing one or more second screens comprising at least content of the request, said at least content of the request comprising the plurality of name value pairs in a plurality of second rows, each name value pair in the plurality of name value pairs being comprised in a single line of a second row in the plurality of second rows, each second row comprising a plurality of lines, the plurality of lines being sequenced relative to one another in a specific sequence received in the one or more first screens from the one or more first computers;

in the runtime operation, transmitting to the mobile device, said one or more second screens comprising at least content of the request; and in the runtime operation, receiving and storing said user input in the relational database.

2. The computer-implemented method of claim 1 wherein said at least one rule comprises an operator, an operand and a constant, and the computer-implemented method comprises:

preparing and transmitting one or more third screens to:

receive from the one or more first computers, a first selection identifying the operator in a set of operators;

receive from the one or more first computers, a second selection identifying the operand in a set of operands; and receive from the one or more first computers, the constant;

wherein the operator, the operand and the constant are used in said evaluating.

3. The computer-implemented method of claim 2 wherein the specific software code identified in the rule action pair is a first software code, and the one or more third screens are configured to:

receive from the one or more first computers, a third selection identifying for the rule a type of the operand in a set of types;

wherein the set of types comprises:

a first type identifying the operand as an attribute of the request; and a second type identifying the operand as a result of executing a second software code.

4. The computer-implemented method of claim 1 further comprising, prior to receiving the set of identifiers of one or more regions:

preparing and transmitting one or more third screens to receive, from the one or more first computers, search criteria to identify templates;

preparing and transmitting, to the one or more first computers, a list of names of the templates, in response to receipt of the search criteria; and receiving, from the one or more first computers, a selected name of a template of the request.

5. The computer-implemented method of claim 1 further comprising, prior to receipt of the message that identifies the request:

preparing and transmitting one or more third screens to receive, from the one or more first computers, a mapping between a plurality of input parameters of the specific software code and a plurality of attributes of the request;

wherein the mapping is used in said executing.

6. The computer-implemented method of claim 1 further comprising:

preparing and transmitting one or more third screens to receive a plurality of selections identifying the names in the plurality of name value pairs selected from among a larger plurality of names of attributes output by the specific software code.

7. The computer-implemented method of claim 6 wherein:

at least two rule action pairs correspond to at least two includable regions identified in the set received for the request;

the computer-implemented method further comprises receiving from the one or more first computers, an additional sequence; and at least two rules in said at least two rule action pairs are evaluated relative to one another in said additional sequence.

8. The computer-implemented method of claim 1 wherein the specific software code is comprised as a programmatic method in an object of an application module, and wherein the computer-implemented method comprises:

preparing and transmitting one or more third screens to receive from the one or more first computers, a first selection identifying said application module in a set of application modules deployed in the one or more second computers and a second selection identifying said object in said application module;

wherein the identifier of the specific software code identifies, in said object, said programmatic method.

9. The computer-implemented method of claim 1 wherein the message is hereinafter a first message, and the computer-implemented method further comprises:

responding to receipt of the first message identifying the request, by transmitting a header of the request comprising additional name value pairs;

wherein at least one value in the additional name value pairs identifies said at least one to-be-rendered region.

10. One or more non-transitory computer-readable storage media storing a plurality of instructions which, when executed by one or more processors, cause the one or more processors to generate requests to be displayed, the plurality of instructions comprising:

to execute in a setup operation, instructions to prepare and transmit one or more first screens to receive, from one or more first computers, a set of identifiers of one or more regions that are includable in a request for user input indicative of at least one of approval or disapproval;

to execute in the setup operation, instructions, executable for each includable region identified in the set, to receive from the one or more first computers a rule action pair corresponding to said each includable region, wherein the rule action pair comprises a rule and an identifier of a specific software code to be executed to render said each includable region when the rule is satisfied;

to execute a runtime operation, instructions, in response to receipt from a mobile device of a message that identifies the request, to evaluate in one or more second computers at least one rule in the rule action pair corresponding to at least one includable region identified in the set received for the request, to identify one or more regions to be rendered in displaying the request;

to execute in the runtime operation, instructions, for at least one to-be-rendered region identified by execution of the instructions to evaluate, to execute in the one or more second computers at least the specific software code identified in the rule action pair corresponding to said at least one to-be-rendered region, to obtain from a relational database a plurality of first rows, each first row comprising a plurality of name value pairs; and to execute in the runtime operation, instructions to prepare one or more second screens comprising at least content of the request, said at least content of the request comprising the plurality of name value pairs in a plurality of rows, each name value pair in the plurality of name value pairs being comprised in a single line of a second row in the plurality of second rows, each second row comprising a plurality of lines, the plurality of lines being sequenced relative to one another in a specific sequence received in the one or more first screens from the one or more first computers;

to execute in the runtime operation, instructions to transmit to the mobile device, said at least content of the request; and to execute in the runtime operation, instructions to receive and store said user input in the relational database.

11. The one or more non-transitory computer-readable storage media of claim 10 wherein said at least one rule comprises an operator, an operand and a constant, and the plurality of instructions further comprising:

instructions to prepare and transmit one or more third screens to:

receive from the one or more first computers, a first selection identifying the operator in a set of operators;

receive from the one or more first computers, a second selection identifying the operand in a set of operands; and receive from the one or more first computers, the constant;

wherein the operator, the operand and the constant are used in said evaluating.

12. The one or more non-transitory computer-readable storage media of claim 11 wherein the specific software code identified in the rule action pair is a first software code, and the one or more third screens are configured to:

receive from the one or more first computers, a third selection identifying for the rule a type of the operand in a set of types;

wherein the set of types comprises:

a first type identifying the operand as an attribute of the request; and a second type identifying the operand as a result of executing a second software code.

13. The one or more non-transitory computer-readable storage media of claim 10 wherein the plurality of instructions comprise:

additional instructions executable prior to receipt of the set of identifiers, to:

prepare and transmit one or more third screens to receive, from the one or more first computers, search criteria to identify templates;

prepare and transmit, to the one or more first computers, a list of names of templates, in response to receipt of the search criteria; and receive, from the one or more first computers, a selected name of a template of the request.

14. The one or more non-transitory computer-readable storage media of claim 10 wherein the plurality of instructions comprise:

additional instructions executable prior to receipt of the message that identifies the request, to:

prepare and transmit one or more third screens to receive, from the one or more first computers, a mapping between a plurality of input parameters of the specific software code and a plurality of attributes of the request;

wherein the mapping is used in said instructions to execute.

15. The one or more non-transitory computer-readable storage media of claim 10 wherein the plurality of instructions comprise:

instructions to prepare and transmit one or more third screens to receive a plurality of selections identifying the names in the plurality of name value pairs selected from among a larger plurality of names of attributes output by the specific software code.

16. The one or more non-transitory computer-readable storage media of claim 15 wherein:

at least two rule action pairs correspond to at least two includable regions identified in the set received for the request;

the plurality of instructions comprise instructions to receive from the one or more first computers, an additional sequence; and at least two rules in said at least two rule action pairs are evaluated relative to one another in said additional sequence.

17. The one or more non-transitory computer-readable storage media of claim 10 wherein the specific software code is comprised as a programmatic method in an object of an application module, and the plurality of instructions comprise:

instructions to prepare and transmit one or more third screens to receive from the one or more first computers, a first selection identifying said application module in a set of application modules deployed in the one or more second computers and a second selection identifying said object in said application module;

wherein the identifier of the specific software code identifies, in said object, said programmatic method.

18. The one or more non-transitory computer-readable storage media of claim 10 wherein the message is hereinafter a first message, and the plurality of instructions comprise:

instructions to respond to receipt of the first message identifying the request, by transmitting a header of the request comprising additional name value pairs;

wherein at least one value in the additional name value pairs identifies said at least one to-be-rendered region.

19. The one or more non-transitory computer-readable storage media of claim 10 wherein:

the names in the plurality of name value pairs are implemented as columns in one or more tables of the relational database.

20. An apparatus comprising one or more processors coupled to one or more non-transitory computer-readable storage media, wherein the one or more non-transitory computer-readable storage media comprise a plurality of instructions executable by the one or more processors, the apparatus comprising:

to execute in a setup operation, means for preparing and transmitting one or more first screens to receive, from one or more first computers, a set of identifiers of one or more regions that are includable in a request for user input indicative of at least one of approval or disapproval;

to execute in the setup operation, means, configured for each includable region identified in the set, for receiving from the one or more first computers a rule action pair corresponding to said each includable region, wherein the rule action pair comprises a rule and an identifier of a specific software code to be executed to render said each includable region when the rule is satisfied;

to execute in a runtime operation, means for responding to receipt from a mobile device of a message that identifies the request, by evaluating in one or more second computers at least one rule in the rule action pair corresponding to at least one includable region identified in the set received for the request, to identify one or more regions to be rendered in displaying the request;

to execute in the runtime operation, means, configured for at least one to-be-rendered region identified by the evaluating, for executing in the one or more second computers at least the specific software code identified in the rule action pair corresponding to said at least one to-be-rendered region, to obtain from a relational database a plurality of first rows, each first row comprising a plurality of name value pairs; and to execute in the runtime operation, means for preparing one or more second screens comprising at least content of the request, said at least content of the request comprising the plurality of name value pairs in a plurality of rows, each name value pair in the plurality of name value pairs being comprised in a single line of a second row in the plurality of second rows, each second row comprising a plurality of lines, the plurality of lines being sequenced relative to one another in a specific sequence received in the one or more first screens from the one or more first computers;

to execute in the runtime operation, means for transmitting to the mobile device, said at least content of the request; and to execute in the runtime operation, means for receiving and storing in the relational database, said user input on said request.

* * * * *

UNITED STATES PATENT AND TRADEMARK OFFICE

CERTIFICATE OF CORRECTION

PATENT NO. : 9,465,607 B2
APPLICATION NO. : 14/735516
DATED : October 11, 2016
INVENTOR(S) : Shanmugam et al.

It is certified that error appears in the above-identified patent and that said Letters Patent is hereby corrected as shown below:

On the Title Page

Column 2, under Attorney, Agent, or Firm, Line 1, delete “Omar” and insert -- Omkar --, therefor.

Signed and Sealed this
Thirteenth Day of June, 2017

Joseph Matal

*Performing the Functions and Duties of the*
*Under Secretary of Commerce for Intellectual Property and*
*Director of the United States Patent and Trademark Office*